(12) United States Patent
Laracey

(10) Patent No.: US 12,705,605 B2
(45) Date of Patent: Aug. 11, 2026

(54) METHODS AND SYSTEMS FOR PROCESSING TRANSACTIONS WITH SECURED STORAGE DEVICES USING A MOBILE DEVICE

(71) Applicant: PayPal, Inc., San Jose, CA (US)

(72) Inventor: Kevin Laracey, Natick, MA (US)

(73) Assignee: PayPal, Inc., San Jose, CA (US)

( * ) Notice: Subject to any disclaimer, the term of this patent is extended or adjusted under 35 U.S.C. 154(b) by 7 days.

(21) Appl. No.: 18/398,929

(22) Filed: Dec. 28, 2023

(65) Prior Publication Data

US 2024/0202714 A1 Jun. 20, 2024

Related U.S. Application Data

(63) Continuation of application No. 17/389,768, filed on Jul. 30, 2021, now Pat. No. 11,887,110, which is a (Continued)

(51) Int. Cl.
*G06F 21/35* (2013.01)
*G06F 21/33* (2013.01)
(Continued)

(52) U.S. Cl.
CPC ....... *G06Q 20/3821* (2013.01); *G06F 21/335* (2013.01); *G06F 21/35* (2013.01); *G06F 21/36* (2013.01); *G06F 21/43* (2013.01); *G06Q 20/1085* (2013.01); *G06Q 20/3223* (2013.01); *G06Q 20/327* (2013.01); *G06Q 20/3274* (2013.01); *G06Q 20/3276* (2013.01);
(Continued)

(58) Field of Classification Search
CPC ........... G06Q 20/3821; G06Q 20/1085; G06Q 20/3223; G06Q 20/327; G06Q 20/3274; G06Q 20/3276; G06Q 20/3224; G06Q 20/326; G06Q 20/4014; G06F 21/35; G06F 21/36; G06F 2221/2111; G06F 2221/2117; G06F 2221/2119; G07F 19/20; G07F 19/203
See application file for complete search history.

(56) References Cited

U.S. PATENT DOCUMENTS 5,739,512 A 4/1998 Tognazzini
6,584,309 B1 * 6/2003 Whigham .............. G06Q 20/16 705/16
(Continued)

FOREIGN PATENT DOCUMENTS

CA 2719945 A1 12/2009
CN 101377874 A 3/2009
(Continued)

OTHER PUBLICATIONS

Canadian Appl. No. 2,795,766, entitled: Mobile Phone Payment Processing Methods and Systems, Examiner's Report dated Dec. 1, 2014, Canadian Intellectual Property Office, 4 pages.
(Continued)

*Primary Examiner* — Christle I Marshall
(74) *Attorney, Agent, or Firm* — Haynes and Boone, LLP

(57) ABSTRACT

Embodiments provide systems, methods, processes, computer program code and means for using mobile devices to conduct transactions with value dispensing devices.

20 Claims, 10 Drawing Sheets

Related U.S. Application Data continuation of application No. 16/704,690, filed on Dec. 5, 2019, now Pat. No. 11,107,072, which is a continuation of application No. 15/912,485, filed on Mar. 5, 2018, now Pat. No. 10,504,108, which is a continuation of application No. 15/602,865, filed on May 23, 2017, now Pat. No. 9,911,120, which is a continuation of application No. 15/057,093, filed on Feb. 29, 2016, now Pat. No. 9,659,294, which is a continuation of application No. 14/158,240, filed on Jan. 17, 2014, now Pat. No. 9,401,077, which is a continuation of application No. 13/336,574, filed on Dec. 23, 2011, now Pat. No. 8,632,000, which is a continuation-in-part of application No. 12/846,911, filed on Jul. 30, 2010, now Pat. No. 8,380,177.

(60) Provisional application No. 61/426,731, filed on Dec. 23, 2010, provisional application No. 61/362,567, filed on Jul. 8, 2010, provisional application No. 61/322,477, filed on Apr. 9, 2010.

(51) Int. Cl.

*G06F 21/36* (2013.01)
*G06F 21/43* (2013.01)
*G06Q 20/10* (2012.01)
*G06Q 20/32* (2012.01)
*G06Q 20/38* (2012.01)
*G06Q 20/40* (2012.01)
*G06Q 40/02* (2023.01)
*G07F 19/00* (2006.01)
*H04L 9/40* (2022.01)
*H04W 12/06* (2021.01)
*H04W 12/069* (2021.01)

(52) U.S. Cl.

CPC ....... *G06Q 20/40145* (2013.01); *G06Q 40/02* (2013.01); *G07F 19/20* (2013.01); *G07F 19/203* (2013.01); *G07F 19/211* (2013.01); *H04L 63/18* (2013.01); *H04W 12/068* (2021.01); *H04W 12/069* (2021.01); *G06F 2221/2101* (2013.01); *G06F 2221/2111* (2013.01); *G06F 2221/2117* (2013.01); *G06F 2221/2119* (2013.01)

(56) References Cited

U.S. PATENT DOCUMENTS 7,040,533 B1 5/2006 Ramachandran
7,210,620 B2 5/2007 Jones
7,320,072 B1 1/2008 Cofta
7,379,921 B1 5/2008 Kiliccote
7,483,858 B2 1/2009 Foran et al.
7,992,776 B1 8/2011 Ramachandran et al.
8,313,020 B2 11/2012 Ramachandran
8,332,320 B2 12/2012 Singh
8,595,098 B2 11/2013 Starai et al.
8,632,000 B2 1/2014 Laracey
9,104,990 B2 * 8/2015 Lowe ................ G06Q 30/0645
9,208,482 B2 12/2015 Laracey
9,412,106 B2 8/2016 Laracey
9,639,837 B2 5/2017 Laracey
9,659,294 B2 5/2017 Laracey
9,741,028 B2 8/2017 Webb et al.
9,911,120 B2 3/2018 Laracey
10,134,031 B2 11/2018 Laracey
10,242,368 B1 3/2019 Poole
10,354,246 B1 * 7/2019 Janiga ................ G06Q 20/1085
10,373,148 B1 * 8/2019 Dixon ................... G06Q 20/22
10,504,108 B2 12/2019 Laracey
10,628,823 B2 4/2020 Laracey
10,810,562 B1 * 10/2020 McKinnon ......... G06Q 20/1085
10,990,967 B2 4/2021 Wang et al.
11,107,072 B2 8/2021 Laracey
2002/0007345 A1 1/2002 Harris
2002/0062175 A1 * 5/2002 Lion ...................... G16H 20/13 700/237
2003/0004737 A1 1/2003 Conquest et al.
2003/0014315 A1 1/2003 Jaalinoja et al.
2003/0110717 A1 6/2003 Rodriguez
2003/0126064 A1 7/2003 Foran et al.
2003/0212471 A1 * 11/2003 Chakravarti ............. G07F 5/18 700/241
2004/0044621 A1 3/2004 Huang et al.
2004/0215480 A1 10/2004 Kadaba
2005/0102233 A1 * 5/2005 Park .................... G06Q 20/326 705/44
2005/0203584 A1 9/2005 Twetan et al.
2005/0203854 A1 9/2005 Das et al.
2005/0222961 A1 10/2005 Staib et al.
2006/0085270 A1 4/2006 Ruckart
2006/0105742 A1 5/2006 Kim et al.
2006/0206709 A1 9/2006 Labrou et al.
2007/0052517 A1 3/2007 Bishop et al.
2007/0168297 A1 7/2007 Cheng et al.
2007/0185778 A1 8/2007 Weng
2007/0255620 A1 11/2007 Tumminaro et al.
2007/0278290 A1 12/2007 Messerges et al.
2007/0290836 A1 12/2007 Ainsworth et al.
2007/0294182 A1 12/2007 Hammad
2007/0295805 A1 12/2007 Ramachandran
2008/0034221 A1 2/2008 Hammad et al.
2008/0048022 A1 2/2008 Vawter
2008/0052226 A1 2/2008 Agarwal et al.
2008/0078831 A1 4/2008 Johnson et al.
2008/0086766 A1 4/2008 Kaler et al.
2008/0133351 A1 6/2008 White et al.
2008/0155258 A1 6/2008 Obereiner et al.
2008/0201224 A1 8/2008 Owens et al.
2008/0222048 A1 9/2008 Higgins et al.
2008/0252415 A1 10/2008 Larson et al.
2008/0313456 A1 12/2008 Menadue et al.
2009/0012901 A1 1/2009 Singh et al.
2009/0063312 A1 3/2009 Hurst
2009/0066509 A1 3/2009 Jernstrom et al.
2009/0111378 A1 4/2009 Sheynman et al.
2009/0144550 A1 6/2009 Arunan
2009/0153327 A1 6/2009 Hartwig et al.
2009/0164796 A1 6/2009 Peirce
2009/0192913 A1 7/2009 Saito et al.
2009/0240626 A1 9/2009 Hasson et al.
2009/0254479 A1 10/2009 Pharris
2009/0288012 A1 11/2009 Hertel et al.
2009/0307140 A1 12/2009 Mardikar
2009/0325484 A1 12/2009 Lele et al.
2010/0017327 A1 1/2010 Treadwell et al.
2010/0082485 A1 4/2010 Lin et al.
2010/0090810 A1 4/2010 Gallo et al.
2010/0125510 A1 5/2010 Smith et al.
2010/0153272 A1 6/2010 Wentker et al.
2010/0241565 A1 9/2010 Starai et al.
2010/0276484 A1 11/2010 Banerjee et al.
2011/0055084 A1 3/2011 Singh
2011/0066550 A1 3/2011 Shank et al.
2011/0145152 A1 6/2011 Mccown
2011/0191252 A1 8/2011 Dai
2011/0231238 A1 9/2011 Khan et al.
2011/0238573 A1 9/2011 Varadarajan
2011/0251892 A1 10/2011 Laracey
2011/0258123 A1 10/2011 Dawkins et al.
2012/0160912 A1 6/2012 Laracey
2012/0173431 A1 7/2012 Ritchie et al.
2012/0187187 A1 7/2012 Duff et al.
2012/0193434 A1 8/2012 Grigg et al.
2012/0203700 A1 8/2012 Ornce et al.
2012/0215701 A1 8/2012 Mehta et al.
2013/0046753 A1 * 2/2013 Bowers ................... G06F 16/29 707/E17.082
2013/0054336 A1 2/2013 Graylin
2013/0080276 A1 3/2013 Granbery

(56) References Cited

U.S. PATENT DOCUMENTS

| | | | |
|---|---|---|---|
| 2013/0110654 | A1 | 5/2013 | Kobres |
| 2013/0110676 | A1 | 5/2013 | Kobres |
| 2013/0110717 | A1 | 5/2013 | Kobres |
| 2013/0110727 | A1 | 5/2013 | Kobres |
| 2013/0110728 | A1 | 5/2013 | Kobres |
| 2013/0124411 | A1 | 5/2013 | Kobres et al. |
| 2013/0132234 | A1 | 5/2013 | Grossi et al. |
| 2013/0173474 | A1 | 7/2013 | Ranganathan et al. |
| 2013/0179285 | A1 | 7/2013 | Lyle |
| 2013/0246203 | A1 | 9/2013 | Laracey |
| 2013/0282502 | A1 | 10/2013 | Jooste |
| 2013/0290087 | A1 | 10/2013 | Merwarth et al. |
| 2013/0311313 | A1 | 11/2013 | Laracey |
| 2014/0054367 | A1 | 2/2014 | Alexeev |
| 2014/0074714 | A1* | 3/2014 | Melone ................ G06Q 20/322 235/487 |
| 2014/0114857 | A1 | 4/2014 | Griggs et al. |
| 2014/0188586 | A1 | 7/2014 | Carpenter et al. |
| 2015/0120504 | A1 | 4/2015 | Todasco |
| 2015/0227888 | A1 | 8/2015 | Levanon et al. |
| 2016/0048830 | A1 | 2/2016 | Laracey |
| 2016/0132875 | A1 | 5/2016 | Blanco et al. |
| 2016/0180307 | A1 | 6/2016 | Laracey |
| 2023/0267442 | A1* | 8/2023 | Dadhaniya ......... G06Q 20/3278 705/43 |

FOREIGN PATENT DOCUMENTS

| | | | |
|---|---|---|---|
| CN | 101377875 | A | 3/2009 |
| CN | 101990772 | A | 3/2011 |
| CN | 111476654 | A | 7/2020 |
| EP | 1513120 | A2 | 3/2005 |
| EP | 1264259 | B1 | 2/2007 |
| EP | 2088549 | A1 | 8/2009 |
| EP | 2128809 | A1 | 12/2009 |
| EP | 2951762 | A4 | 8/2016 |
| JP | 2002032686 | A | 1/2002 |
| JP | 2002109421 | A | 4/2002 |
| JP | 2003141402 | A | 5/2003 |
| JP | 2003521028 | A | 7/2003 |
| JP | 2004246536 | A | 9/2004 |
| JP | 2004326348 | A | 11/2004 |
| JP | 2005092338 | A | 4/2005 |
| JP | 2005157426 | A | 6/2005 |
| JP | 2005276023 | A | 10/2005 |
| JP | 2006501584 | A | 1/2006 |
| JP | 2006099713 | A | 4/2006 |
| JP | 2006199873 | A | 8/2006 |
| JP | 2006243842 | A | 9/2006 |
| JP | 2006277715 | A | 10/2006 |
| JP | 2007034941 | A | 2/2007 |
| JP | 2007299316 | A | 11/2007 |
| JP | 2008129787 | A | 6/2008 |
| JP | 2008217277 | A | 9/2008 |
| JP | 2008242828 | A | 10/2008 |
| JP | 2009048601 | A | 3/2009 |
| JP | 2009080729 | A | 4/2009 |
| JP | 2009276838 | A | 11/2009 |
| JP | 2011518377 | A | 6/2011 |
| JP | 2011141853 | A | 7/2011 |
| JP | 2011210171 | A | 10/2011 |
| JP | 2012027824 | A | 2/2012 |
| JP | 2012048694 | A | 3/2012 |
| JP | 2014503883 | A | 2/2014 |
| JP | 2014508338 | A | 4/2014 |
| KR | 20060084520 | A | 7/2006 |
| KR | 20100018744 | A | 2/2010 |
| KR | 20110006736 | A | 1/2011 |
| KR | 20110039946 | A | 4/2011 |
| KR | 20110053216 | A | 5/2011 |
| KR | 20120103924 | A | 9/2012 |
| KR | 20130000072 | A | 1/2013 |
| WO | 0163546 | A1 | 8/2001 |
| WO | 2008153096 | A1 | 12/2008 |
| WO | 2009146110 | A1 | 12/2009 |
| WO | 2010035224 | A2 | 4/2010 |
| WO | 2010056480 | A1 | 5/2010 |
| WO | 2010125577 | A1 | 11/2010 |
| WO | 2011112990 | A1 | 9/2011 |
| WO | 2011127354 | A2 | 10/2011 |
| WO | 2011153281 | A2 | 12/2011 |
| WO | 2012082258 | A1 | 6/2012 |
| WO | 2012087957 | A1 | 6/2012 |
| WO | 2012088512 | A2 | 6/2012 |
| WO | 2013009063 | A2 | 1/2013 |
| WO | 2014001853 | A1 | 1/2014 |
| WO | 2014130222 | A1 | 8/2014 |
| WO | 2020141853 | A1 | 7/2020 |

OTHER PUBLICATIONS

Canadian Appl. No. 2,795,766, Examiner's Report, Canadian Intellectual Property Office, dated Dec. 1, 2014, 4 pages.

Canadian Patent Application No. 2,819,696, Examiner's Report, dated Sep. 8, 2014, Canadian Intellectual Property Office, entitled: Mobile Phone Payment Processing Methods and Systems, 4 pages.

Chinese Appl. No. 201180028666.2, Chinese Office Action, dated May 26, 2015, 32 pages.

European Appl. No. 11766781.6, Communication Pursuant to Rule 114(2) EPC, European Patent Office, Aug. 30, 2013, 8 pages.

European Appl. No. 11766781.6, Communication pursuant to Rules 70(2) and 70a(2) EPC mailed on Apr. 15, 2014, 1 page.

European Appl. No. 11766781.6, Extended European Search Report mailed on Mar. 27, 2014, 7 pages.

European Appl. No. 11851732.5, Extended European Search Report mailed on Jun. 3, 2014, 6 pages.

European Appl. No. 13791465.1, Examination Report dated May 8, 2018, 6 pages.

European Appl. No. 13791465.1, Extended European Search Report mailed on Dec. 7, 2015, 8 pages.

European Appl. No. 14753967, Extended European Search Report mailed Jul. 13, 2016, 8 pages.

European Appl. No. 15755379.3, Extended European Search Report mailed Aug. 7, 2017, 6 pages.

Examination Search Report for Canadian Application No. 2898205, mailed on Mar. 23, 2022, 4 pages.

Francis L., et al., "Potential Misuse of NFC Enabled Mobile Phones with Embedded Security Elements as Contactless Attack Platforms", 2009 International Conference for Internet Technology and Secured Transactions (ICITST), IEEE, 2009, 8 pages.

International Appl. No. PCT/US2011/031696, International Search Report and Written Opinion dated Dec. 7, 2011, 11 pages.

International Appl. No. PCT/US2011/067197, International Search Report and Written Opinion dated Aug. 14, 2012, 16 pages.

International Appl. No. PCT/US2013/040953, International Preliminary Report on Patentability dated Nov. 27, 2014, 10 pages.

International Appl. No. PCT/US2013/040953, International Search Report and Written Opinion dated Sep. 13, 2013, 11 pages.

International Appl. No. PCT/US2013/042714, International Preliminary Report on Patentability dated Dec. 4, 2014, 7 pages.

International Appl. No. PCT/US2013/042714, International Search Report and Written Opinion dated Sep. 13, 2013, 10 pages.

International Appl. No. PCT/US2014/013955, International Search Report and Written Opinion mailed on May 20, 2014, 13 pages.

International Appl. No. PCT/US2015/017823, International Search Report and Written Opinion mailed May 22, 2015, 11 pages.

International Preliminary Report on Patentability for Application No. PCT/US2011/031696 mailed on Oct. 18, 2012, 7 pages.

International Preliminary Report on Patentability for Application No. PCT/US2011/067197 mailed on Jul. 4, 2013, 8 pages.

International Preliminary Report on Patentability for Application No. PCT/US2014/013955 mailed on Aug. 13, 2015, 11 pages.

International Preliminary Report on Patentability for Application No. PCT/US2015/017823 mailed on Sep. 9, 2016, 10 pages.

Japanese Appl. No. 2013-503978, Office Action dated Dec. 9, 2013, 8 pages.

(56) References Cited

OTHER PUBLICATIONS

Japanese Appl. No. 2014-264651, Japan Patent Office, English Translation of Office Action, Notice of Reasons for Rejection dated Jan. 12, 2016, pp. 1-2.
Japanese Appl. No. 2015-512757, dated Mar. 20, 2018, Japan Patent Office, "Office Action—Notice of Reason for Rejection", 8 pages.
Japanese Patent Appl. No. 2013-503978, "English-language Translation of Japanese Office Action", dated Aug. 21, 2014, 2 pages.
Japanese Patent Appl. No. 2013503978, "Japanese Office Action", dated Aug. 21, 2014, 3 pages.
Japanese Patent Appl. No. 2013-546454, English-Language Translation of Japanese Office Action, dated Jul. 29, 2014, 11 pages.
NTTDATA., "Bill Paying by Mobile Phone Using Barcode Capture", Retrieved from Internet URL: http://www.nttdata.com/global/en/newscenter/global/2006/pdf/110800.pdf, Nov. 8, 2006, 4 pages.
Office Action for Japanese Application No. 2021-088551, mailed on Aug. 2, 2022, 3 pages.
Chinese Appl. No. 202210231616.4, Chinese Office Action, dated Dec. 3, 2025, 8 pages.

* cited by examiner

METHODS AND SYSTEMS FOR PROCESSING TRANSACTIONS WITH SECURED STORAGE DEVICES USING A MOBILE DEVICE

CROSS REFERENCE TO RELATED APPLICATIONS

This application is a continuation of U.S. patent application Ser. No. 17/389,768, filed Jul. 30, 2021, which is a continuation of U.S. patent application Ser. No. 16/704,690 filed on Dec. 5, 2019, (now U.S. Pat. No. 11,107,072), which is a continuation of U.S. patent application Ser. No. 15/912,485, filed Mar. 5, 2018 (now U.S. Pat. No. 10,504,108), which is a continuation of U.S. patent application Ser. No. 15/602,865 (now U.S. Pat. No. 9,911,120), filed May 23, 2017 which is a continuation of U.S. patent application Ser. No. 15/057,093 (now U.S. Pat. No. 9,659,294), filed Feb. 29, 2016, which is a continuation of U.S. patent application Ser. No. 14/158,240, filed Jan. 17, 2014 (now U.S. Pat. No. 9,401,077, issued Jul. 26, 2016), which is a continuation of U.S. patent application Ser. No. 13/336,574, filed Dec. 23, 2011 (now U.S. Pat. No. 8,632,000, issued Jan. 21, 2014). U.S. patent application Ser. No. 13/336,574 is a continuation-in-part of U.S. patent application Ser. No. 12/846,911, filed Jul. 30, 2010 (now U.S. Pat. No. 8,380,177, issued Feb. 19, 2013). U.S. patent application Ser. No. 13/336,574 claims the benefit of U.S. Provisional Application No. 61/426,731, filed Dec. 23, 2010. U.S. patent application Ser. No. 12/846,911 claims the benefit of U.S. Provisional Application No. 61/362,567, filed Jul. 8, 2010. U.S. patent application Ser. No. 12/846,911 also claims the benefit of U.S. Provisional Application No. 61/322,477, filed Apr. 9, 2010. All of the above applications are hereby incorporated by reference in their entirety for all purposes.

BACKGROUND

Automated Teller Machines ("ATMs") have been in use for years, and consumers rely on their ability to access cash around the world at these devices. In a typical ATM transaction, a consumer inserts a plastic card into a card reader of the ATM and the ATM reads information from a magnetic stripe on the card or a chip embedded in the card. The information is used to establish communication with a financial institution associated with the consumer's financial account, and the consumer is then prompted to enter a personal identification number ("PIN") or other verification information. Once verified, the consumer is able to select an amount of cash (subject to account limits and balance) to receive from the ATM. The process is simple and relatively secure, and consumers around the world are used to the process.

Increasingly, however, consumers wish to conduct transactions without plastic payment cards. For example, the inventor of the instant application described systems and methods for using mobile devices (such as mobile phones) to conduct purchase transactions at merchant in U.S. patent application Ser. No. 12/846,911, filed on Jul. 30, 2010, the contents of which are hereby incorporated herein in their entirety for all purposes.

It would be desirable to allow consumers an ability to interact with ATM devices using their mobile device (such as a mobile phone) to withdraw cash or to conduct other transactions at the ATM.

These, and other, problems are solved by using systems and methods of the present invention. Other advantages and features will become apparent upon reading the following disclosure.

DESCRIPTION

Figure 1:
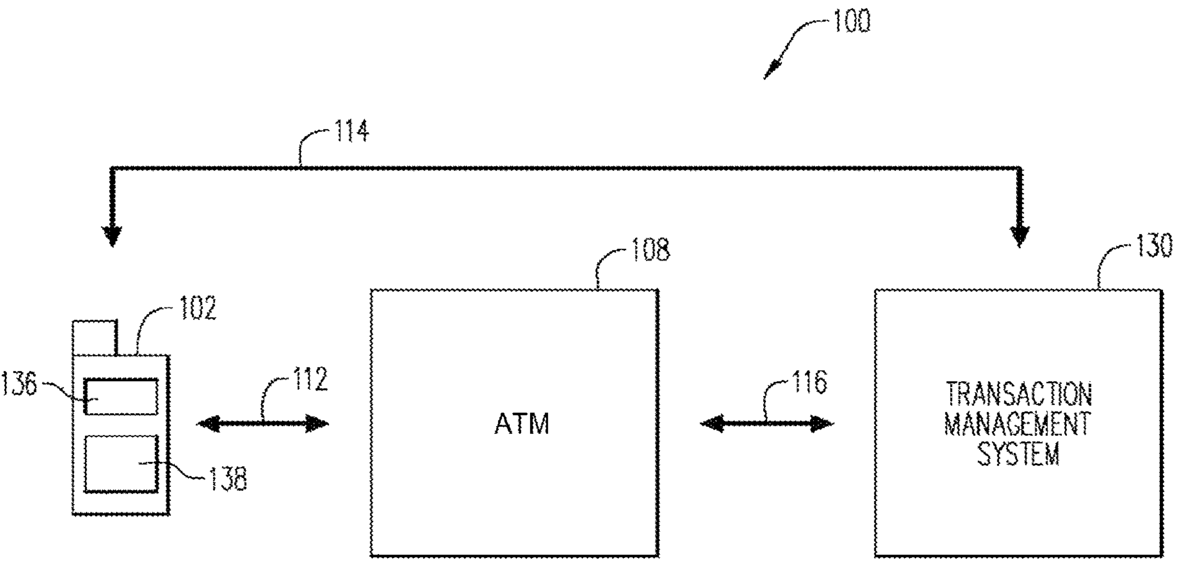
FIG. 1 is a block diagram depicting a transaction system configured pursuant to some embodiments.

Embodiments of the present invention relate to systems, methods, processes, computer program code, and means for using mobile devices to conduct transactions with ATM devices or other cash dispensing devices (hereinafter referred to simply as "ATM devices" or "ATMs"). In some embodiments, a mobile device configured using features of the present invention may be capable of initiating ATM transactions, including cash withdrawals or the like.

A number of terms are used herein for convenience and ease of exposition. For example, the term "capture" will be used to refer to the act of scanning, reading or other capturing of an "ATM code" or "ATM token" (an identifier used to identify specific transactions conducted at ATM devices or to otherwise facilitate a transaction at an ATM device pursuant to some embodiments). The term "capturing" (or "captured") is not intended to be limiting, and is intended to encompass embodiments where a mobile device is operated to receive an ATM code (or data associated with an ATM code) via key entry, via image capture, via RFID reading, and using other scanning, reading, or other techniques described herein. Pursuant to some embodiments, the term "capture" further includes any decoding or image processing of an ATM code required to retrieve or otherwise obtain information from the ATM code.

As another example, the term "wireless" is used to refer to unwired remote communication techniques, such as, for example, using radio frequency or other electromagnetic radiation based communication techniques (including RFID, NFC, wifi, Bluetooth, zigbee or other techniques). Those skilled in the art, upon reading this disclosure, will appreciate that the use of these terms is not intended to be limiting, but for the purposes of exposition.

Prior to discussing details of certain embodiments, an illustrative (but not limiting) example of a transaction using features of the present invention will first be presented. In the illustrative example, a customer has an iPhone.®. She has installed an ATM transaction application (which is configured pursuant to the present invention) onto her iPhone. The ATM transaction application allows her to use her iPhone at certain ATM devices to conduct ATM transactions. She wants to withdraw $100 from her checking account, and approaches an ATM device that participates in the system of the present invention. At the ATM, she interacts with the ATM display to select an option to "Conduct a Mobile Transaction". This causes the ATM device to send a message to a transaction management system notifying the system that a transaction is to be conducted at that ATM device. The transaction management system creates an "ATM code" to be displayed at the ATM device. She then uses her iPhone to capture the code from the ATM device. The captured ATM code and transaction details are transmitted from the iPhone to the transaction management system, and the transaction management system validates the transaction and transmits instructions to the ATM device to dispense the funds.

In this manner, embodiments allow customers to initiate and conduct a wide variety of transactions at ATM devices without need to insert a traditional payment card (such as a debit card or the like) at the ATM device. As will be discussed further herein, the use of a mobile device allows greater flexibility and control of the transaction, and users enjoy a number of advantages, including, for example, the ability to access a wide variety of accounts (without carrying plastic cards for each account), and the ability to apply preferences and other transaction rules. Other advantages will become apparent upon reading the following disclosure. Further, pursuant to some embodiments, the ATM transaction application described herein may be integrated with the mobile payment applications described in our co-pending and commonly assigned U.S. patent application Ser. No. 12/846,911 so that mobile devices may be used to both conduct ATM transactions as well as to conduct purchase transactions at a wide variety of merchants.

System Overview

Features of some embodiments of the present invention will now be described by reference to FIG. 1, which is a block diagram of a system 100 pursuant to some embodiments. As shown, a payment account holder, or other user or operator (hereafter, the "customer" or "account holder") may have or use a mobile device 102 (such as a mobile telephone or the like). The mobile device 102 has a display screen 136 and a data entry device 138 (such as a keypad or touch screen). Pursuant to embodiments of the present invention, the customer may use the mobile device 102 to conduct ATM transactions with an ATM device 108 by interacting with the ATM device 108 and by interacting with an ATM application on the mobile device 102. No plastic card (such as a debit card, ATM card or other bank card) need be inserted into the ATM device 108, instead, the transaction occurs without the presentation or insertion of a plastic card into the ATM device 108. The ATM device 108 may be a traditional ATM device (such as an ATM manufactured by Diebold.® or the like) or other cash dispensing apparatus, such as an unattended kiosk, or the like.

In a typical example transaction, a customer (who has an ATM application pursuant to the present invention installed on or accessible to their mobile device 102) approaches an ATM device 108. The customer may authenticate themselves to an ATM application on the mobile device 102 and then operate the mobile device 102 and the ATM application to cause a token or code associated with the ATM device 108 and the current transaction to be scanned (shown as interaction 112 in FIG. 1). Alternatively, the customer may authenticate themselves to the ATM application after scanning the ATM token or code from the ATM device 108. Further details of the authentication and transaction process will be described further below. In general, however, the customer authenticates themselves as the legitimate user of the mobile device 102 (and the ATM application thereon) to a remote transaction management system 130, and identifies which ATM device the customer wishes to transact with, and in some embodiments, which transaction is to be completed, by capturing a token or code associated with the ATM device.

In situations where the customer authenticates themselves to the ATM application first (before scanning the ATM code), the customer authentication information (such as a passcode or PIN) are transmitted from the mobile device 102 to a transaction management system 130 over a communication path 114 (e.g., via a wireless or cellular network).

In some embodiments, the customer may authenticate themselves by entering information into the ATM device (either before or after the ATM code is scanned). Again, these variations will be described further below.

After the authentication process, and after an ATM code has been scanned from the ATM device, data from the ATM code is transmitted from the mobile device 102 to the remote transaction management system 130 so that the transaction management system 130 may identify the specific transaction the mobile device 102 is involved in as well as the particular ATM device 108 that the customer wishes to interact with. This may be performed, for example, by matching the ATM code captured by the mobile device 102 with the corresponding code information at the transaction management system 130 (which may be, for example, stored in a record of a pending transaction table of a database at the system 130 which was generated when the ATM device 108 informed the system 130 of the start of the transaction). In this way, the mobile device 102, the ATM device 108 and the transaction are matched. Once this matching has been performed, a response message may be returned to the mobile device 102 prompting the customer to perform a next step in the transaction. In some embodiments, the transaction management system 130 may also transmit data to the ATM device 108 to facilitate a transaction involving the mobile device 102. For example, the transaction management system 130, interacting with either the mobile device 102 or the ATM device 108 (or a combination thereof), may cause a display to be presented to the customer presenting the customer with transaction options available (such as, withdraw funds, make a balance inquiry, make a funds transfer, transfer funds to another account holder, etc.). The display may be displayed on either the ATM device 108 or the mobile device 102. The customer then follows the prompts and completes the desired transaction.

In this manner, embodiments allow customers operating mobile devices to interact with ATM devices in a way which allows the customer to perform transactions (such as cash withdrawals) to be made at ATM machines. This allows customers to reduce the number and type of credit and debit cards they carry, and, instead, perform a wide variety of common transactions using a mobile device such as a mobile telephone or the like.

A number of techniques may be used to generate or present the ATM code. Pursuant to some embodiments, the ATM code is dynamically generated for each ATM transaction (or for each ATM device location). In some embodiments, the ATM code is a static identifier associated with an individual ATM device 108 location. In some embodiments, whether the ATM code is static or dynamically generated, the ATM code may be displayed on a display device of the ATM device 108 (or on a display associated with the ATM device 108).

From the customer perspective, the ATM transaction process of the present invention may begin with the customer performing an authentication process to confirm their identity and authority to conduct ATM transactions using the present invention. The authentication process may be performed after, or in some situations, prior to the customer's scanning of an ATM code at a desired ATM device 108. Pursuant to some embodiments, the authentication process serves to authenticate the customer to the transaction management system 130. The authentication process may involve the customer launching a mobile ATM application or a Web browser on the mobile device 102 and providing one or more credentials or items of information to the transaction management system 130 via communication path 114. For example, the authentication process may involve the entry of a user identifier, a password, or other credentials into a login screen or other user interface displayed on a display device 136 of the mobile device 102. The transaction management system 130 compares the received information with stored information to authenticate the customer.

The authentication process, in some embodiments, also involves the comparison of one or more attributes of the mobile device 102 with a stored set of attributes collected from the mobile device 102 during a registration process (where attributes associated with a particular mobile device are linked to a record associated with the consumer). For example, the attributes may include identifiers associated with the mobile device 102 which uniquely identify the device. In this way, the customer is authenticated two ways—with something they know (login credentials), and something they have (mobile device). Once the customer is successfully authenticated, then the system has access to a variety of attributes about the customer, including a list of payment accounts that the customer previously identified to the transaction management system 130 as part of the registration process.

After (or, in some embodiments, before) a successful authentication process, the customer is prompted to scan, capture (or otherwise enter) the ATM code from an ATM device 108 (shown as interaction 112 between the mobile device 102 and the ATM device 108). The ATM code is used, as described further herein, to uniquely identify a specific transaction involving a specific ATM device 108, so that transactions pursuant to the present invention may be accomplished. After capture of the ATM code, the mobile device 102 transmits the ATM code to the transaction management system 130.

The transaction management system 130, upon receipt of the ATM code from the mobile device 102, performs a lookup to uniquely identify the current transaction and the specific ATM device 108 and to confirm that the transaction can occur between the customer and the ATM device 108. If the current transaction and the specific ATM device 108 are identified, a response message is transmitted to the mobile device 102 with instructions prompting the customer to take a next step (which may include further interaction with the mobile device 102 or ATM device 108 to select further transaction options).

Pursuant to some embodiments, the mobile device 102 may be a smart phone or a Web enabled mobile device such as, for example, an iPhone.®, an Android.® phone, or any phone that can access and display Web content or access the Internet. In some embodiments, the mobile device 102 communicates with transaction management system 130 using a cellular or wireless network. In some embodiments, the transaction management system 130 is a secure server (or network of servers). In some embodiments, the transaction management system 130 is in communication with one or more transaction processing networks (not shown in FIG. 1) such as the STAR.®. network operated by First Data Resources, the VISANET.®. network operated by Visa Inc., the BANKNET.® network operated by MasterCard International, or the like. The transaction management system 130 may also be in communication with other financial transaction networks (such as ACH and EFT networks, private label networks, alternative payment systems such as PayPal.®, or the like) to allow customers operating mobile devices 102 to conduct transactions using a wide variety of different forms of payment instruments and accounts. The transaction management system 130 may further be in communication with one or more ad or offer management networks, such as those provided by Google.®, Apple.®, Yahoo.®, Microsoft.® or the like. As will be described further below, data, including advertisements and offers may be received from those networks and presented to customers via the mobile device 102.

Although the system depicted in FIG. 1 (and elsewhere throughout this disclosure) shows only a single mobile device 102, ATM device 108 and transaction management system 130, those skilled in the art will appreciate that in use there will be a number of devices in use, a number of ATM systems and devices and networks using the system, and potentially multiple instances of the transaction management system in operation.

Further System Details

Further details of some aspects of a system according to some embodiments of the present invention will now be described by reference to FIG. 2. FIG.

2 is a block diagram of an example payment system network environment showing communication paths between a mobile device 202, ATM devices 208, transaction management system 230 and payment processing systems 232. Mobile device 202 may be, for example, a mobile telephone, PDA, personal computer, or the like. For example, mobile device 202 may be an iPhone.® from Apple, Inc., a BlackBerry.® from RIM, a mobile phone using the Google Android.® operating system, or the like. Pursuant to some embodiments, mobile device 202 may operate an ATM application allowing mobile device 202 to operate as a payment device as described herein. In some embodiments, mobile device 202 is capable of accessing and displaying Web content or otherwise accessing the Internet so that a customer operating mobile device 202 may interact with transaction management system 230 to initiate a transaction via a Web interface.

Figure 2:
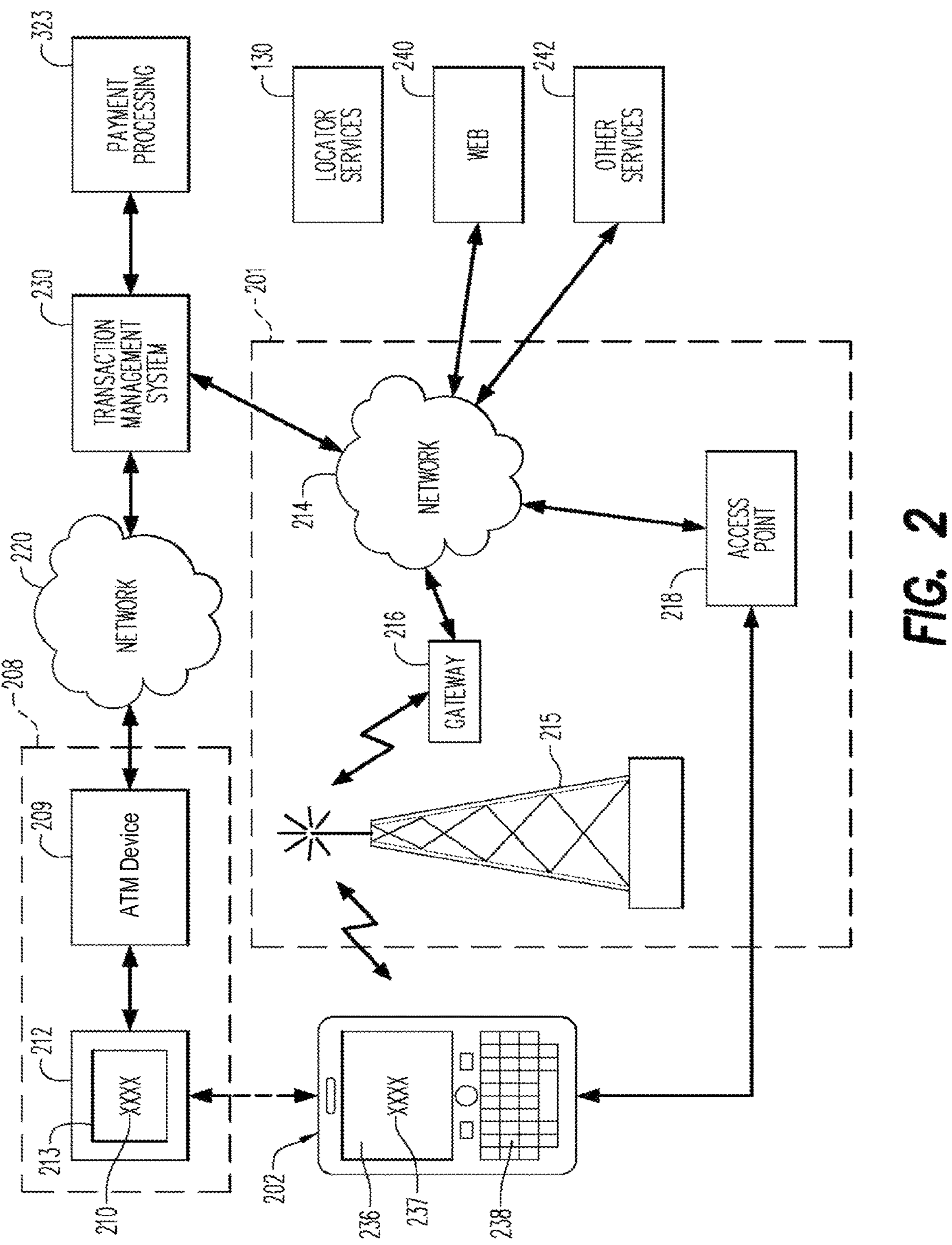
FIG. 2 is a block diagram depicting further details of a transaction system configured pursuant to some embodiments.

Mobile device 202 of FIG. 2 can, for example, communicate over one or more wired and/or wireless networks 201. As an example, a wireless network can be a cellular network (represented by a cell transmitter 215). A mobile device 202 may communicate over a cellular or other wireless network and through a gateway 216 and then communicate with a network 214 (e.g., such as the Internet or other public or private network). An access point, such as access point 218 may be provided to facilitate data and other communication access to network 214. Access point 218 may be, for example, compliant with the 802.11g (or other) communication standards. For example, in embodiments in which a mobile device 202 is operating an ATM application which allows mobile device 202 to function as a payment device pursuant to the invention, the ATM application may cause or control communication of data through network 201 to transaction management system 230.

In some embodiments, mobile device 202 may engage in both voice and data communications over wireless network 214 via access point 218. For example, mobile device 202 may be able to place or receive phone calls, send and receive emails, send and receive short message service ("SMS")

messages, send and receive email messages, access electronic documents, send and receive streaming media, or the like, over the wireless network through access point 218. Similar communications may be made via network 215.

In some embodiments, a mobile device 202 may also establish communication by other means, such as, for example, wired connections with networks, peer-to-peer communication with other devices (e.g., using Bluetooth networking or the like), etc. Mobile device 202 can, for example, communicate with one or more services over networks 201, such as the transaction management system 230 (to conduct payment transactions, to create, edit, view or otherwise modify payment account settings and preferences, etc.), the Web 240, and other services 242. Mobile device 202 can also access other data over the one or more wired and/or wireless networks 201. For example, content providers, such as news sites, RSS feeds, web sites, blogs, social networking sites, developer networks, etc., can be accessed by mobile device 202. Such access can be provided by invocation of a web browsing function or application (e.g., a browser) in response to a customer launching a Web browser application installed on mobile device 202. In some embodiments, a user may utilize a Web browser to interact with transaction management system 230 to register transaction accounts, establish account preferences, perform ATM or other financial transactions, etc.

Mobile device 202 has a display screen 236 and a data entry device 238 (such as a keypad or touch screen, or voice interface). Pursuant to embodiments of the present invention, the customer may use the mobile device 202 to conduct ATM transactions with one or more ATM devices 208. ATM devices 208 may be traditional ATMs or other kiosks or cash dispensing devices. Mobile device 202, in some embodiments, also has a camera (not shown) or other image capture device which allows the mobile device 202 to capture an image or representation of an ATM token 210 associated with an ATM device 208. Mobile device 202, in some embodiments, also has a wireless receiver (not shown) or other wireless signal receiving device which allows the mobile device 202 to capture a wireless signal representation of an ATM token 210. For example, a customer may operate mobile device 202 to take a digital picture or capture the image of an ATM code 210 displayed on or at an ATM device 208 to initiate an ATM transaction using the present invention. The captured image is shown as item 237 on the display screen 236. As will be described further below, the ATM code 210 may be used to initiate and conduct transactions with an ATM device (as well as to conduct transactions with merchants pursuant to the disclosure of our co-pending application Ser. No. 12/846,911).

Pursuant to embodiments of the present invention, an ATM code 210 is displayed on or near a display device 212 of an ATM device 208 point of sale. The ATM code 210 may be either a "static" ATM code or a "dynamic" ATM code. In situations where static ATM codes are used, the ATM code may be printed, displayed, or provided near the ATM device (such as on a sticker or placard displayed so the customer can easily see and read or capture the ATM token). Static ATM codes 210 may be printed as a bar code image, as an alphanumeric identifier, or in other forms. In some embodiments, ATM codes may be presented in forms which are easily discernable by a human so that they may be both key-entered or captured using a mobile device 202.

In embodiments where dynamic ATM codes are used, the ATM code may be displayed on a display device 213 associated with an ATM device 208. A dynamic ATM code may be generated to uniquely identify a specific transaction involving an ATM device, and may be "dynamic" in that the ATM code information changes from transaction to transaction (e.g., the ATM code may be randomly generated for each transaction, or may be based on a time stamp as well as the location of the ATM device, transaction details, or the like). In some embodiments, the dynamic code includes information about a specific transaction (which may be generated based on information entered by the customer either at the mobile device 202 or at the ATM device 208 when the transaction is initiated). For example, the code may encode or include information identifying a transaction type (deposit, withdrawal, funds transfer, person to person transfer, etc.) and/or a transaction amount. In some embodiments, the dynamic code may also encode or include information associated with additional information helpful or related to the transaction or specifying one or more targeted offers or messages (such as by including an informational or messaging URL or the like). In some embodiments, where transaction information is encoded in the code 210, when the mobile device 202 is subsequently operated to scan or capture the ATM code 210, the mobile device may decode some or all of the information to speed the transaction process (e.g., to identify or confirm the transaction type or amount).

A transaction at an ATM device 208 may proceed in several ways pursuant to various embodiments of the present invention. For example, in one embodiment, the transaction starts at the ATM device 208 with a customer selecting an option to initiate a mobile transaction, which causes an ATM code to be displayed on a display device of the ATM device 208 for capture by the mobile device 202. Information associated with the ATM code, as well as additional information may be transmitted to a transaction management system 230 for processing. For example, information may be transmitted from the mobile device 202 to a transaction management system 230 to verify a device signature of the mobile device. The device signature may be a unique combination of hardware attributes selected to verify the mobile device's signature to verify that the device was known or recognized by the system 230. If the device signature is not recognized, the ATM transaction process may not proceed. The customer is then prompted to enter "something they know" such as a user identifier and password or PIN (or other user credentials). This information would be used to verify that the user has a valid account on the system 230. In some embodiments, the information may be entered into the mobile device 202, while in other embodiments the information may be entered into the ATM device 208.

Once the user has been successfully authenticated, the system 230 would then take the additional step of verifying that the device signature of the mobile device 202 was associated with the user credentials that had been entered. If the association was valid, the customer could continue the ATM transaction. If not, the ATM transaction would be ended by the system 230.

In this way, the customer would have identified themselves as an authorized user of the network (and participant in the system 230) by using something they have (their specific mobile device 202) and something they know (such as their user identifier and password or other credentials).

In some embodiments, the customer is prompted to (and does) scan the ATM code 210 prior to the authentication processing. In other embodiments, the customer may be prompted to perform the authentication processing first, and then is prompted to (and does) scan a ATM code 210 displayed on the ATM device 208 to indicate which specific ATM device 208 they wish to transact with (e.g., to receive cash from).

Regardless of whether the code is scanned before or after authentication, the ATM code may be a either a static or a dynamic code. A "dynamic" ATM code 210 may be a visual code generated for each transaction, and may be displayed as a barcode (or other image) on a display device 212 associated with the ATM device 208. In some embodiments, the ATM code 210 may be a static visual ATM code such as a barcode that is fixed (and uniquely associated with a specific ATM device 208). In some embodiments, the ATM code 210 is a static or dynamic ATM code in an RFID or NFC chip that can be read by a mobile device 202 with an NFC or RFID reader.

Once authentication of the customer and the mobile device 202 is complete, and the ATM code 210 has been scanned and transmitted to the transaction management system 230, the customer may be presented with a user interface and transaction options in several different ways. For example, the user interface (which may provide options such as "get balance", "make withdrawal", "make transfer", etc) may be displayed on a display screen 236 of the mobile device 202 (and the selections may be communicated to the transaction management system 230 through network 201, and then relayed to the ATM device 208 through network 220). As another example, the user interface may be displayed on a display screen 212 of the ATM device 208 (and the customer's selections may be communicated to the transaction management system 230 through network 220).

Once the instructions have been confirmed and passed to the ATM device 208, the ATM device may be operated to perform any required actions (such as to dispense a certain amount of currency, display a balance, print a receipt, etc.). The reconciliation from the customer's account is performed under control of the transaction management system 230 (e.g., to cause an amount of funds to be debited from a selected account, or the like).

In some embodiments, the mobile device 202 implements the same derived unique key per transaction encryption scheme as used on the ATM device 208 which, in effect, turns the mobile device in to an ATM device with the same encryption scheme. For example, the mobile device 202 may act as a hardware security module to generate encryption keys in a tamper proof manner. The derived unique keys may be used to encrypt data sent to and from the mobile device 202 in the same manner as if the data was sent from the actual ATM device 208.

In an alternative embodiment, an ATM transaction proceeds as follows. First, the customer launches an ATM application on their mobile device 202, and the transaction management system 230 verifies the "device signature" of the mobile device (a unique combination of device hardware attributes) to verify the mobile device's signature with a set of known signatures to verify that the mobile device was "known" to the system 230. If the mobile device signature was not recognized, the customer could not proceed further in the authentication process.

Next, the customer scans an ATM code 210 displayed on the ATM device 208. The ATM code 210 that is scanned is sent by the mobile device 202 to the transaction management system 230, which then compares the received ATM code 210 to determine: (i) if the ATM code 210 is a valid ATM code issued by the system 230 (and, in some embodiments, matches a transaction record created when a dynamic code was generated for the ATM device), (ii) the location of the ATM device 208 that the ATM code 210 was allocated or associated with, and/or (iii) transaction details (such as the type of transaction, the transaction amount, etc.). As discussed above, the ATM code 210 may be static or dynamic.

The customer is then prompted to enter "something they know" such as a user identifier and password or PIN (or other user credentials). This information would be used to verify that the customer has a valid account on the system 230. The information may be entered into the mobile device 202 or into the ATM device 208.

Once successfully authenticated, the system 230 would then take the additional step of verifying that the device signature of the mobile device 202 was associated with the user credentials that had been entered. If the association was valid, the customer could continue the session. If not, the session would be ended by the system 230. In this way, the customer would have identified themselves as an authorized user of the system 230 by using something they have (their mobile device 202) and something they know (userid and password or other credentials).

Once authentication of the customer and the mobile device 202 is complete, the customer may be presented with a user interface and transaction options in several different ways. For example, the user interface (which may provide options such as "get balance", "make withdrawal", "make transfer", etc) may be displayed on a display screen 236 of the mobile device 202 (and the selections may be communicated to the transaction management system 230 through network 201, and then relayed to the ATM device 208 through network 220). As another example, the user interface may be displayed on a display screen 212 of the ATM device 208 (and the customer's selections may be communicated to the transaction management system 230 through network 220).

Once the instructions have been confirmed and passed to the ATM device 208, the ATM device may be operated to perform any required actions (such as to dispense a certain amount of currency, display a balance, print a receipt, etc.). The reconciliation from the customer's account is performed under control of the transaction management system 230 (e.g., to cause an amount of funds to be debited from a selected account, or the like).

User Interface Examples

Figure 3:
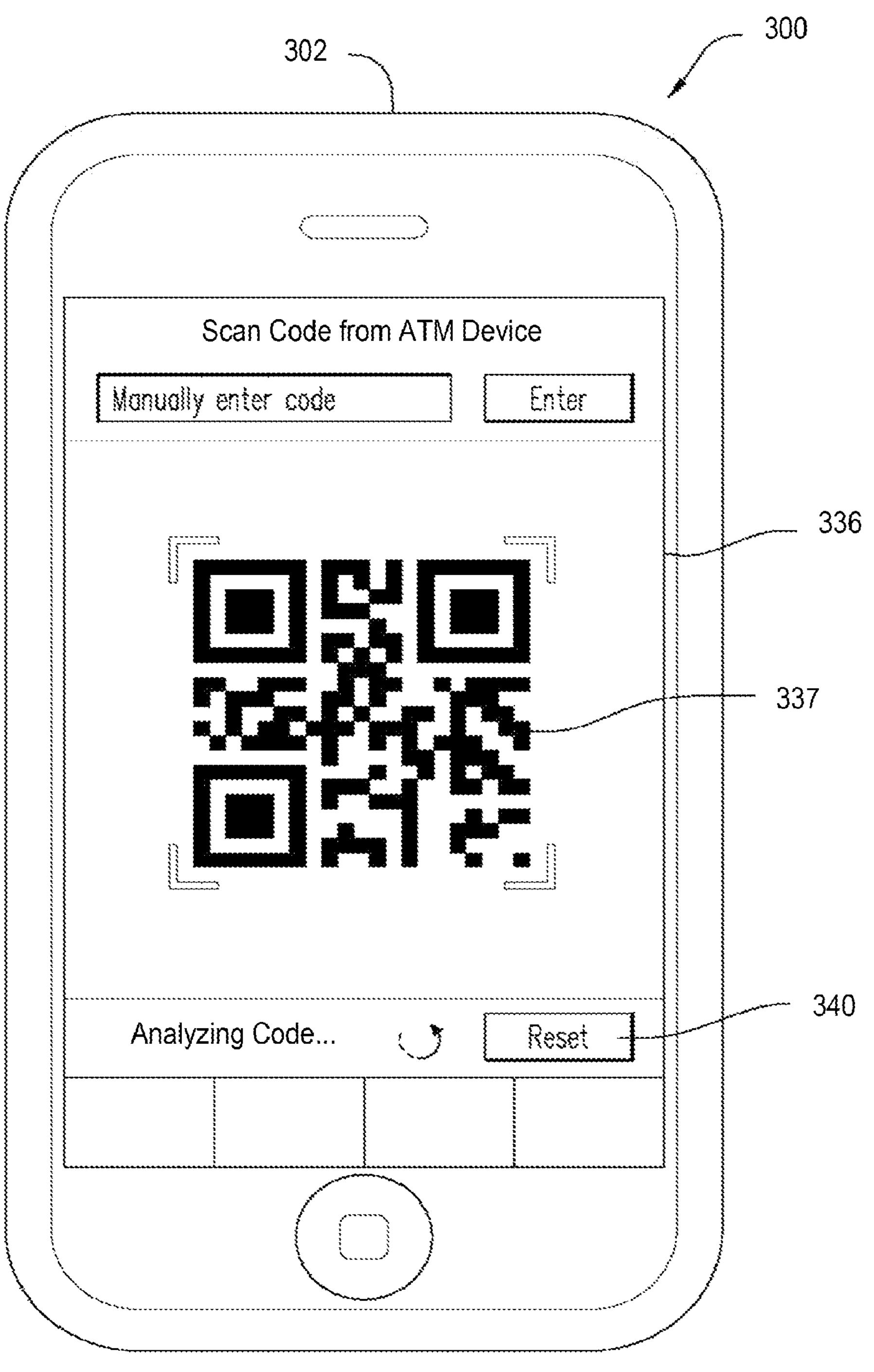
FIGS. 3-6 are sample user interfaces associated with embodiments of the present invention.

Reference is now made to FIG. 3 which depict an illustrative user interface that may be presented to a user operating a mobile device (such as the mobile device 202 of FIG. 2) on a display screen of the device (such as the display 236 of FIG. 2) so that the customer can conduct ATM transactions using features of embodiments of the present invention. The customer interface is shown as being displayed on an Apple iPhone mobile device—those skilled in the art will appreciate that similar user interfaces may be displayed on other mobile devices.

A mobile device 302 is shown which has a display 336 showing an image of an ATM code (represented as a dynamic two dimensional bar code image or "QR code" 337) which has been captured or imaged by a camera associated with the mobile device 302. The ATM code has been captured by a customer operating the mobile device 302 during the course of an ATM transaction using embodiments of the present invention (e.g., the display shown in FIG. 3 may have been captured during the transaction processing described herein). In some embodiments, the mobile ATM application running on the mobile device 302 is configured to automatically capture, decode, and transmit the code during the course of an ATM transaction. While the code is shown as being an encoded two dimensional bar code image, those skilled in the art will appreciate that it may be displayed in any of a number of different formats, such as, for example, a 1 dimensional barcode format such as a UPC, code 39, EAN 8 or EAN 13, other two dimensional formats such as PDF 417 or Datamatrix, other n dimensional barcode formats, or alphanumeric text or symbols or the like.

The display of the mobile device 302 also includes a number of buttons or icons 340, 342 which allow the customer to perform functions associated with the payment system of the present invention. For example, as depicted, the customer may choose to reset 340 the capturing of the ATM code (e.g., in the event that the code was not properly captured or read) or the customer may select among other choices. In some embodiments, the selection or specification of transaction details may, instead, be displayed on a display screen of the ATM device 208.

Those skilled in the art will appreciate that other user interfaces, messages and screens may be used to present payment options, transaction information and other details to a user of a mobile ATM application pursuant to the present invention.

Figure 4A:
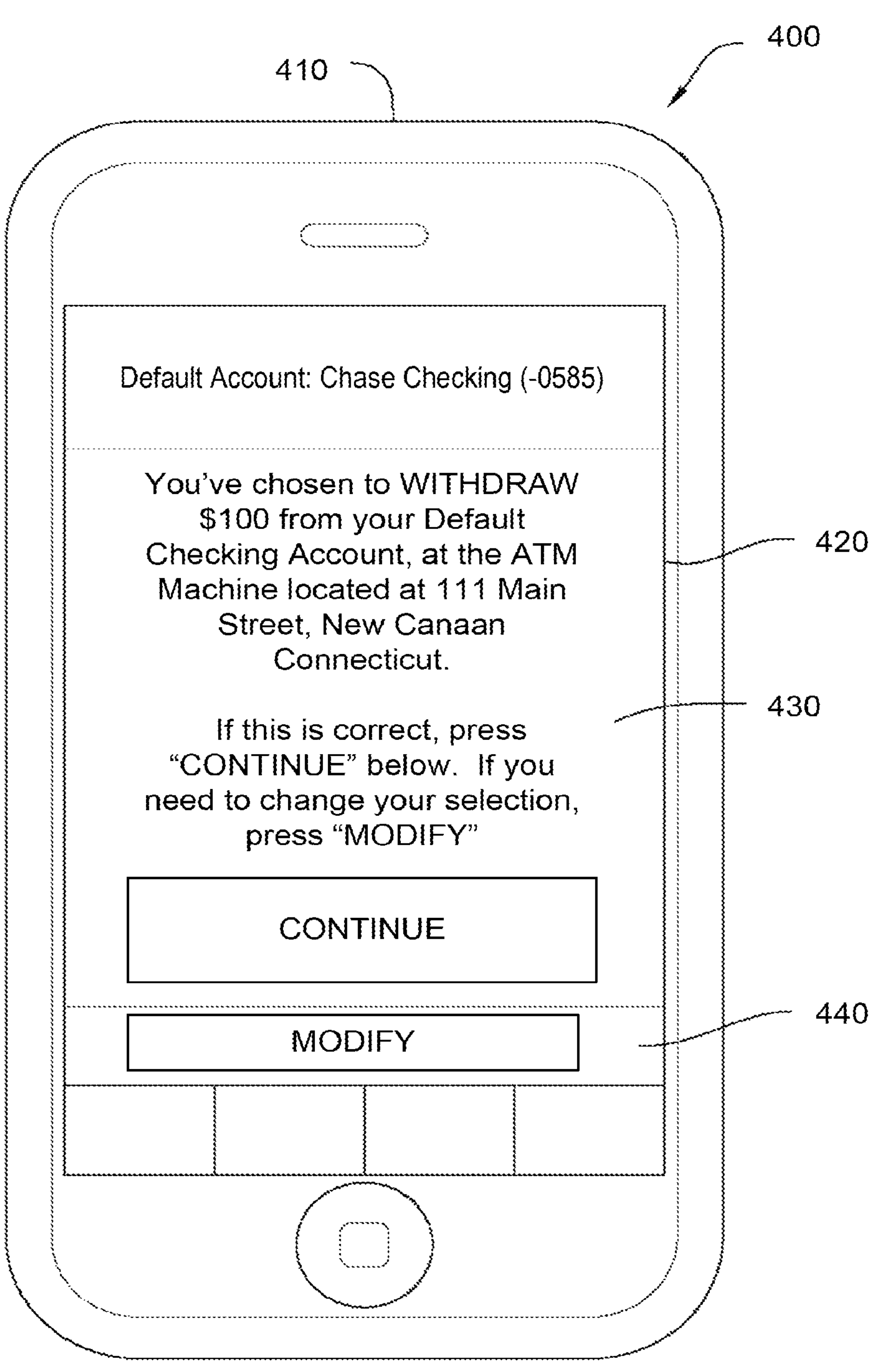
Figure 4B:
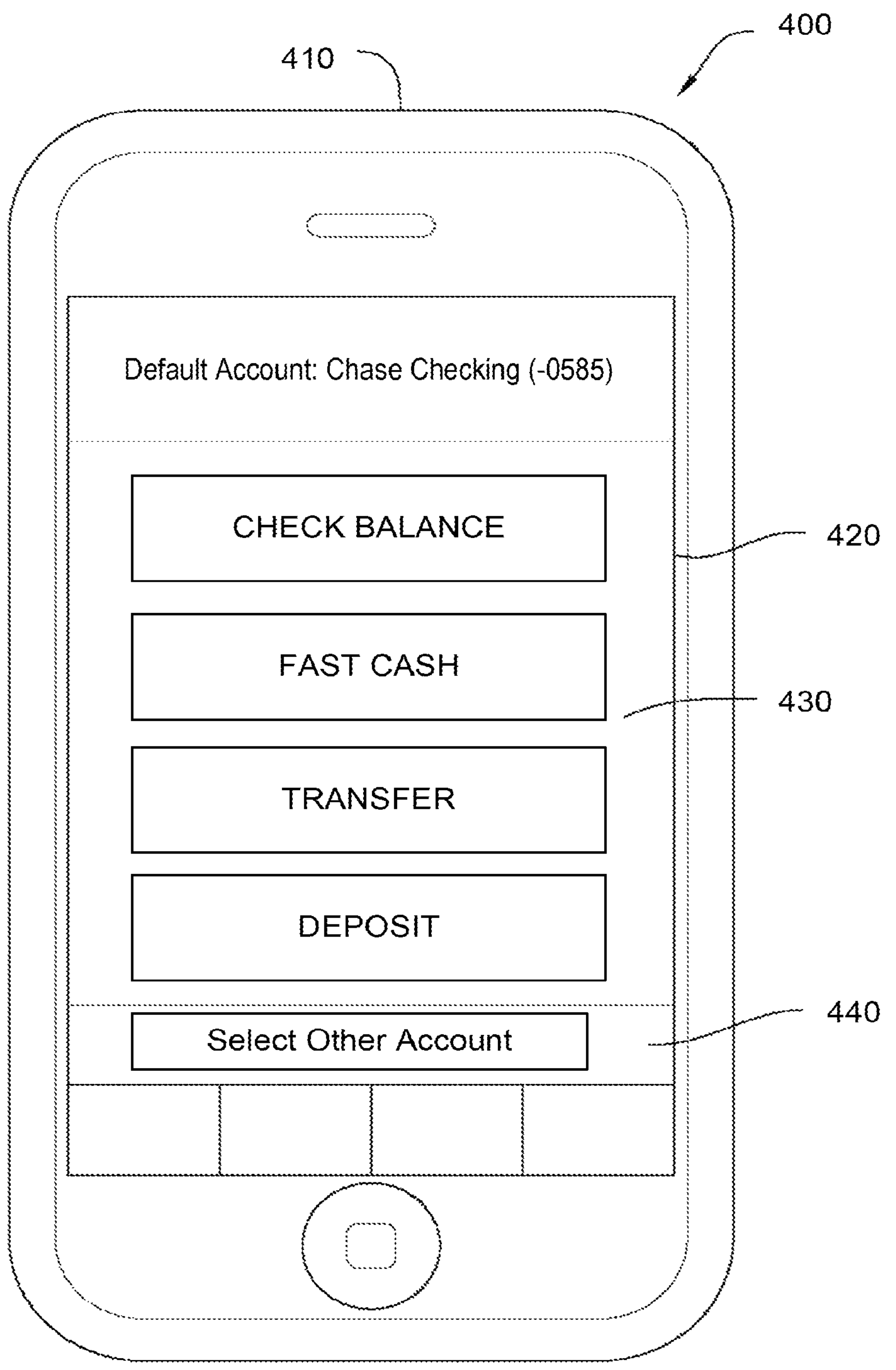

For example, as shown in FIGS. 4A-4B, a further user interface 420 may be displayed after the customer launches an ATM payment application pursuant to the present invention. The user interface 420 may be displayed before or after the ATM code has been captured. An embodiment where the user interface 420 is displayed after an ATM code has been captured is shown in FIG. 4A. As depicted, the user interface 420 displays information confirming the transaction details and information entered by the account holder at the ATM device. In some embodiments, this information may be obtained by the mobile device 202 from information associated with the ATM code captured by the mobile device 202. In some embodiments, as depicted in the embodiment illustrated in FIG. 4B, transaction options may be selected by the account holder on the mobile device 202 prior to the time the ATM code is captured. For example, as shown in FIG. 4B, the user interface 420 provides a number of options associated with a default transaction account previously specified by the customer. Those skilled in the art will appreciate that additional or different options may be presented. Further, some or all of the options may instead, or in addition, be displayed to the customer on a display device of the ATM device 208.

Figure 5A:
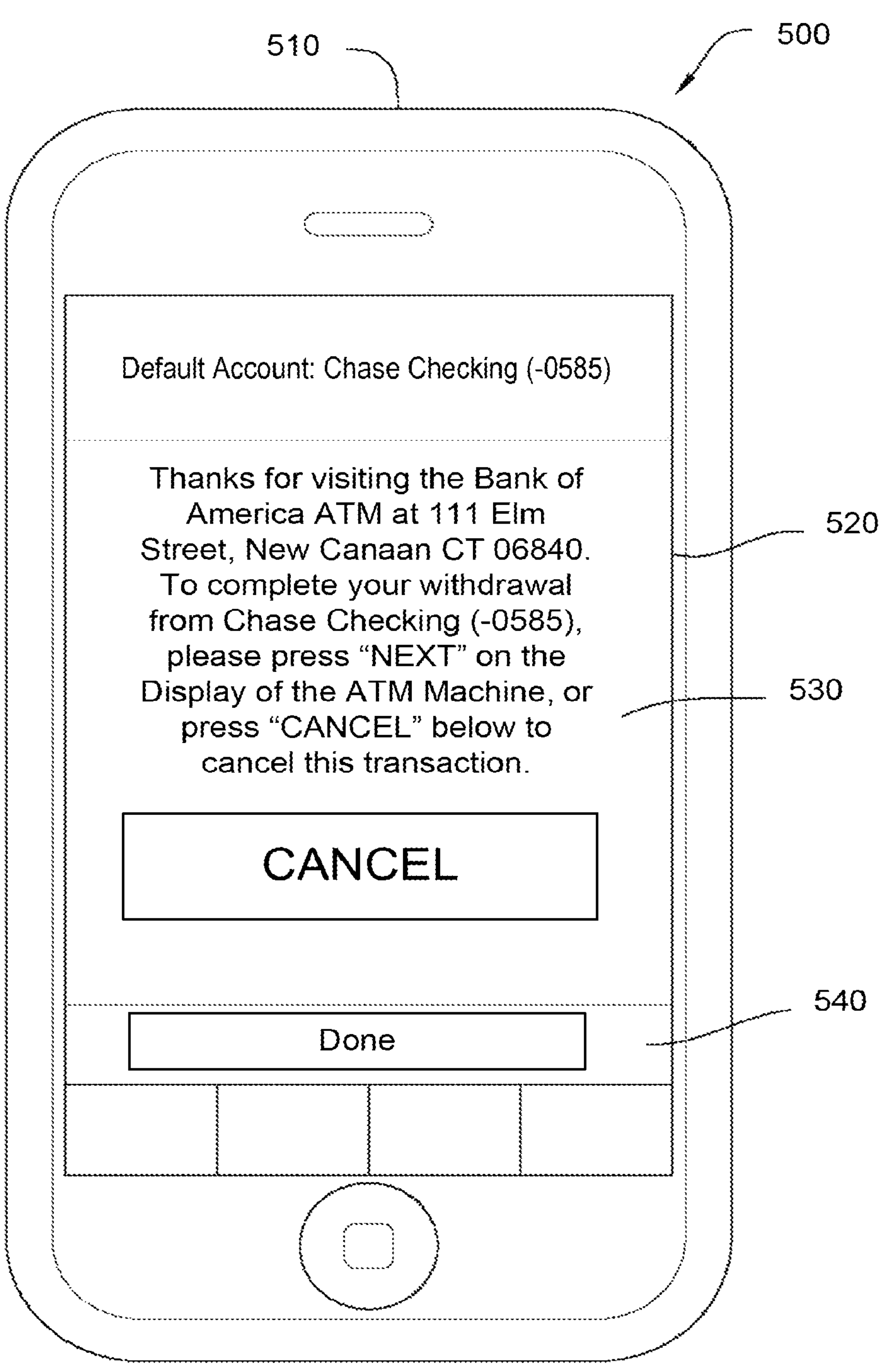
Figure 5B:
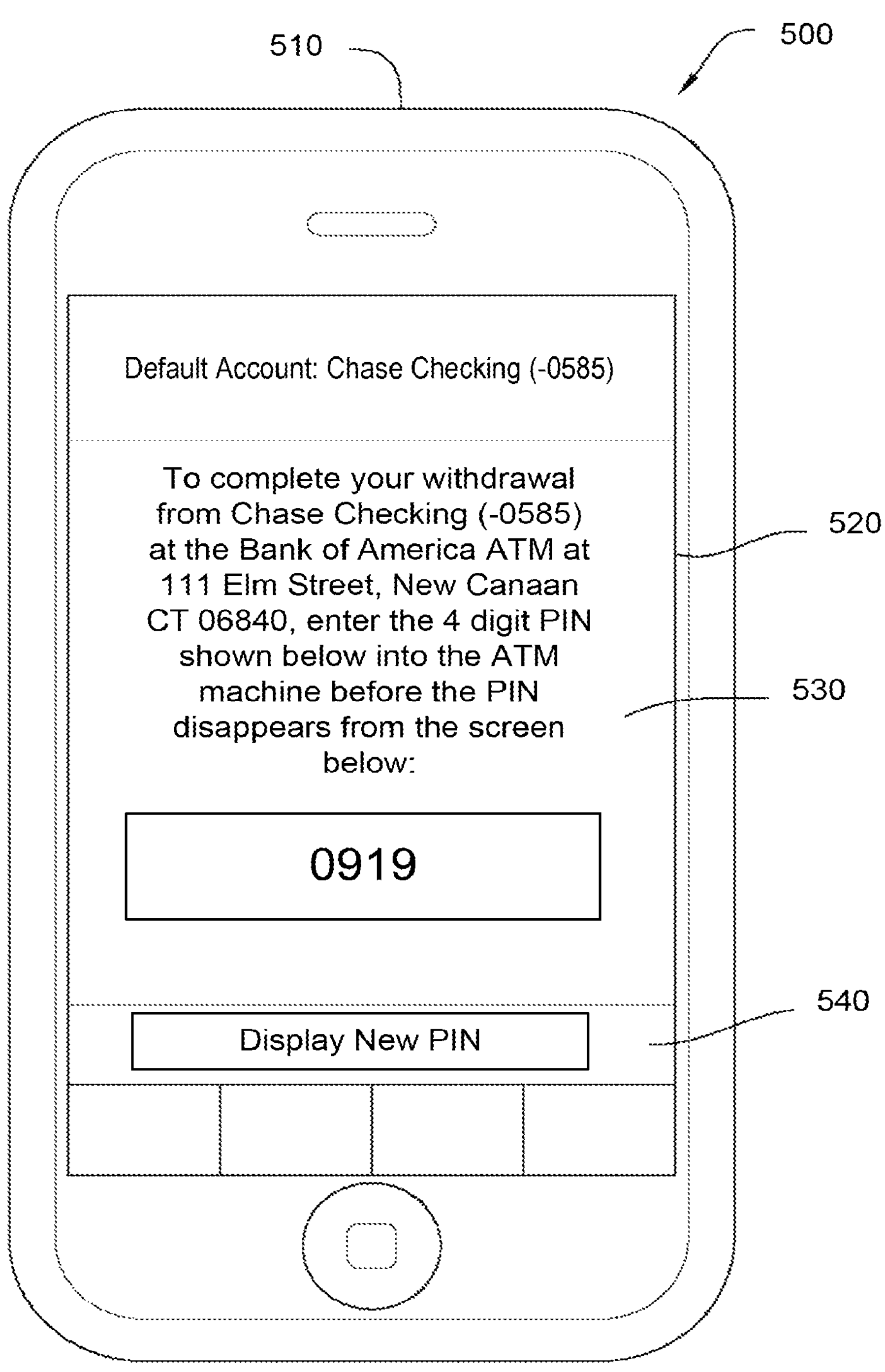

As shown in FIGS. 5A-5B, a further user interface 520 may be displayed to the customer providing instructions on how to complete the transaction at the selected ATM device 208. In some embodiments, the user interface 520 instructs the customer to interact with the ATM device 208 to finalize the transaction. For example, the customer may be instructed to press a button or make a selection on a display screen or keypad of the ATM device 208 (such as "next" or the like). Since the transaction management system 230 has been in communication with the ATM device 208, instructions authorizing the ATM device 208 to complete the transaction will have been sent, and the customer can complete the transaction.

In some embodiments, to provide an additional step to confirm the customer is authorized to complete the transaction with the ATM device 208, a further step such as shown in the user interface 520 of FIG. 5B may be used. In the illustrated example, a shared secret (such as a passcode or the like) may be transmitted to both the mobile device 202 and to the ATM device 208 to allow the customer to complete the requested transaction. Those skilled in the art, upon reading this disclosure, will appreciate that other interactions or messages may be presented to the customer providing instructions on how the transaction at the ATM device 208 is to be completed.

Figure 6:
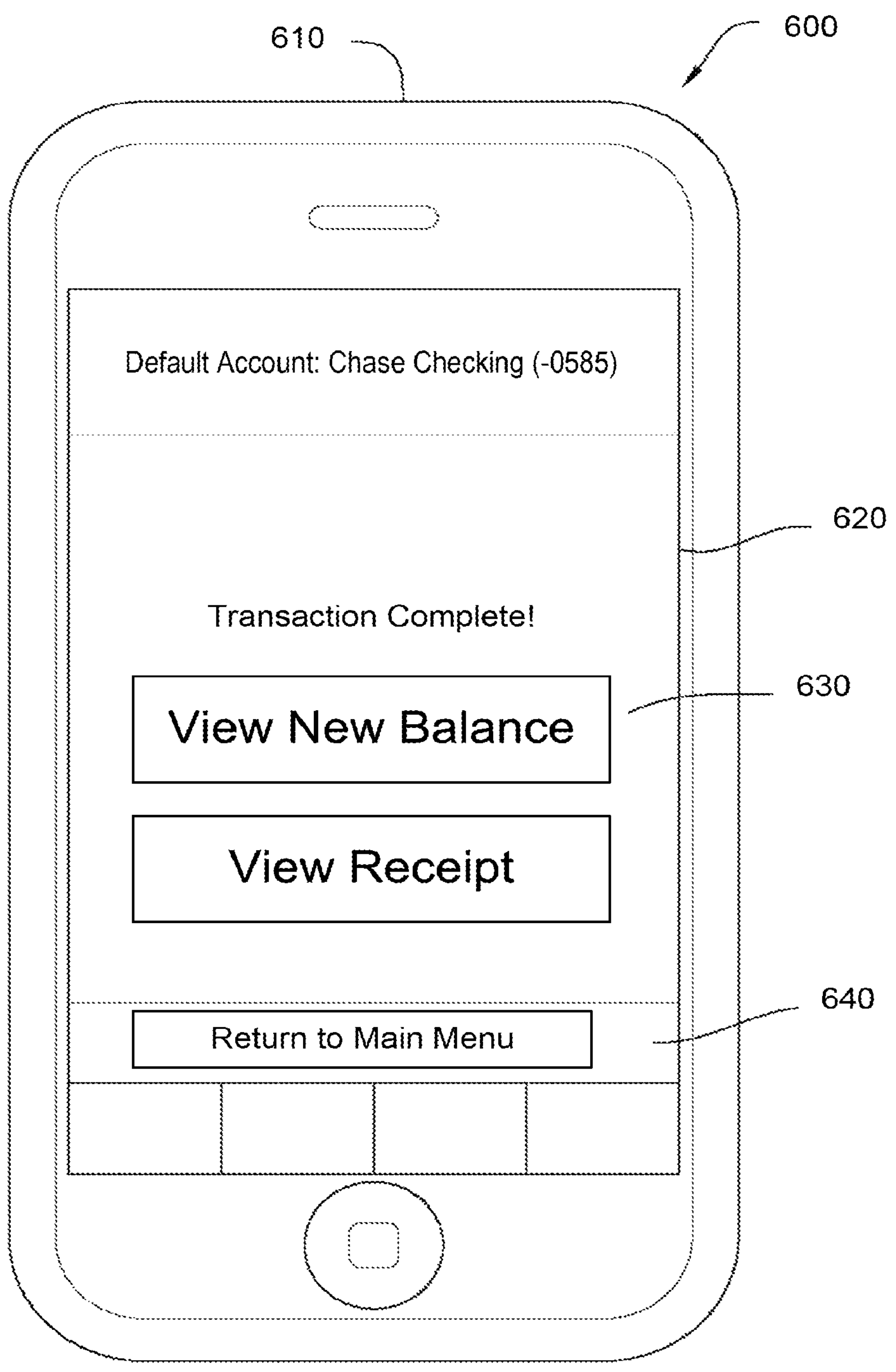

As shown in FIG. 6, a confirmation screen may be displayed to the customer at the end of the requested transaction. In some embodiments, the customer may be presented with additional options associated with the transaction.

Mobile Device

Figure 7:
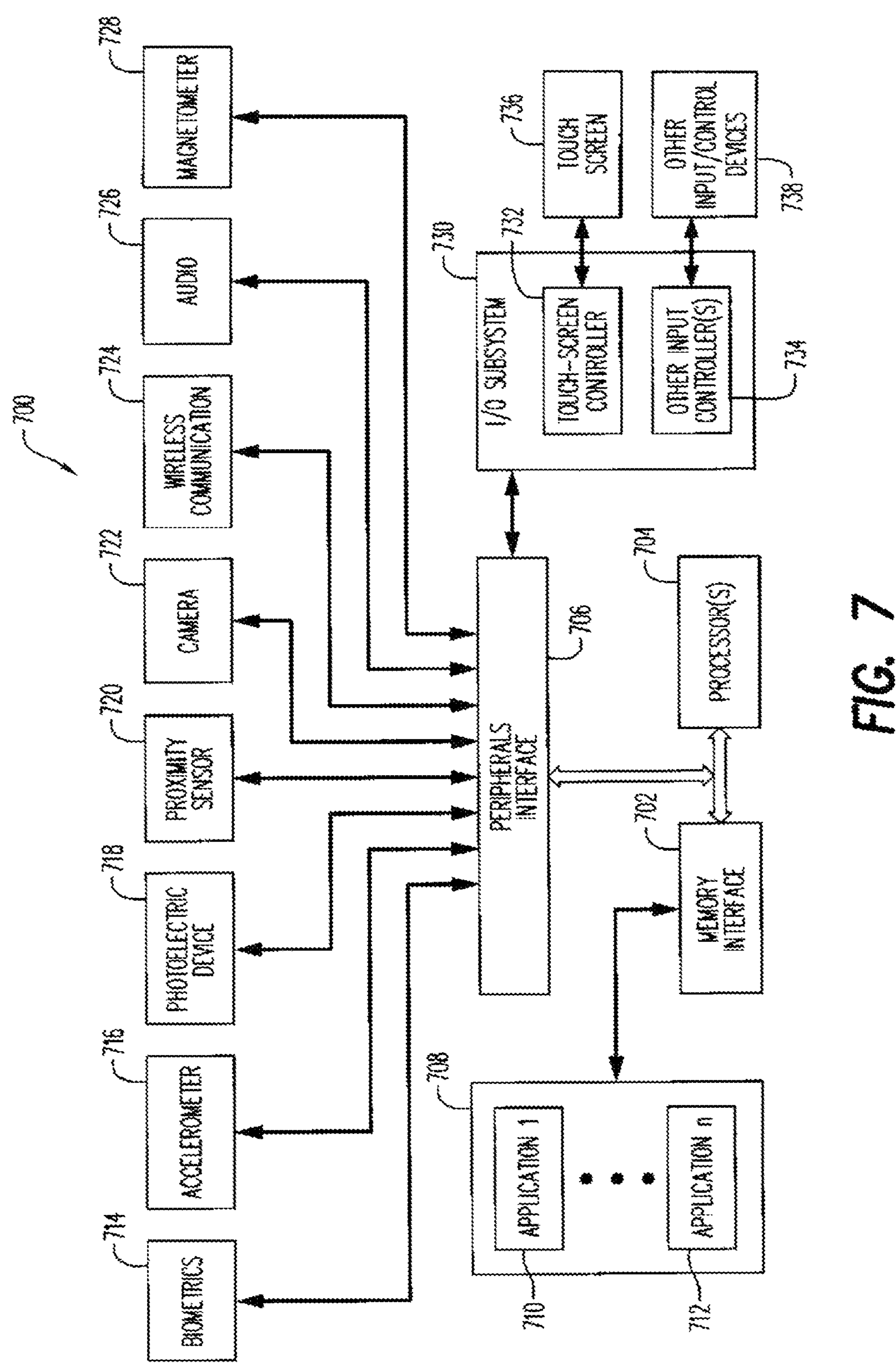
FIG. 7 is a block diagram depicting features of a mobile device pursuant to some embodiments.

Reference is now made to FIG. 7, where a block diagram is shown depicting components of a mobile device 700 pursuant to some embodiments. As depicted, the mobile device 700 includes a number of components which may be controlled or perform functions in conjunction with one more application programs 710-712 to perform the features of some embodiments.

The mobile device 700 can include a memory interface 702 one or more data processors, image processors and/or central processing units 704, and a peripherals interface 706. The memory interface 702, the one or more processors 704 and/or the peripherals interface 706 can be separate components or can be integrated in one or more integrated circuits. The various components in the mobile device 700 can be coupled by one or more communication buses or signal lines.

Sensors, devices and subsystems can be coupled to the peripherals interface 706 to facilitate multiple functionalities. For example, one or more sensors, including a biometrics sensor 714, an accelerometer 716, a photoelectric device 718, a proximity sensor 720, a camera 722, a wireless communication unit 724, an audio unit 726 and a magnetometer 728 may be provided to facilitate the collection, use and interaction with data and information and to achieve the functions of the payment applications described herein. For example, when provided, the magnetometer 728 may be used to calculate a position of the mobile device 700 in space, allowing improved capturing of ATM codes.

The mobile device 700 may include one or more input/output (I/O) devices 730 and/or sensor devices. For example, input controllers 734 may be provided with a speaker and a microphone (not shown) to facilitate voice-enabled functionalities, such as phone and voice mail functions. In some implementations, a loud speaker can be included to facilitate hands-free voice functionalities, such as speaker phone functions. An audio jack can also be included for use of headphones and/or a microphone.

The I/O subsystem 730 can include a touch screen controller 732 and/or other input controller(s) 734. The touch-screen controller 732 can be coupled to a touch screen 736. The touch screen 736 and touch screen controller 732 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 736.

The other input controller(s) 734 can be coupled to other input/control devices 738, such as one or more buttons, rocker switches, thumb-wheel, infrared port, USB port, and/or a pointer device such as a stylus. The one or more buttons (not shown) can include an up/down button for volume control of the speaker and/or the microphone.

In some implementations, a proximity sensor 720 can be included to facilitate the detection of the account holder positioning the mobile device 700 proximate to an ATM, a display associated with the ATM, or a sticker or other indicator associated with a specific ATM location and, in response, to activate the camera or other reader to detect or capture an image of an ATM code.

Other sensors can also be used. For example, in some implementations, a photoelectric device 718 may be provided to facilitate adjusting the brightness of the touchscreen display 738. In some implementations, an accelerometer 716 can be utilized to detect movement of the mobile device 700, and a magnetometer can also be used to help detect the position of the mobile device. In some embodiments, the mobile device 700 may include circuitry and sensors for supporting a location determining capability, such as that provided by the global positioning system (GPS) or other positioning system (e.g., systems using Wi-Fi access points, television signals, cellular grids, cellular towers, or Uniform Resource Locators (URLs)). In some implementations, a positioning system (e.g., a GPS receiver) can be integrated into the mobile device 700 or provided as a separate device that can be coupled to the mobile device 700 through a peripherals interface 706 to provide access to location-based services. The positioning and location-based services may be used, for example, to tag data transmitted from the mobile device 700 to transaction management systems. For example, such location data may be used to further identify a specific ATM which the customer is interacting with during an ATM transaction, and may also be used to assist in fraud detection by insuring that the mobile device is in close proximity to the ATM location specified in the information received in or derived from a transaction request.

The mobile device 700 can also include a camera lens and sensor 722. In some implementations, the camera lens and sensor 722 can be located on the back surface of the mobile device 700, or on the front surface. The camera can capture still images and/or video. The camera may be used, for example, to capture or capture images of an ATM code associated with a specific ATM to be used by the account holder. In some embodiments, the operation of the camera 722 may be controlled by a transaction application installed on the mobile device 700. As a specific example, when the transaction application is activated to conduct an ATM transaction, the camera 722 may be placed in a ready mode of operation so that as soon as the camera lens and sensor 722 are placed proximate to an ATM code, the camera lens and sensor 722 may be operated to capture an image of the ATM code for use in the ATM transaction application.

The mobile device 700 can also include one or more wireless communication subsystems 724, such as an 802.11b/g communication device, RFID, NFC, and/or a Bluetooth.® communication device. Other communication protocols can also be supported, including other 802.x communication protocols (e.g., WiMax, Wi-Fi), code division multiple access (CDMA), global system for mobile communications (GSM), Enhanced Data GSM Environment (EDGE), 3G (e.g., EV-DO, UMTS, HSDPA,), 4G, LTE, etc.

In some implementations, additional sensors or subsystems may be coupled to the peripherals interface 706 via connectors such as, for example a Universal Serial Bus (USB) port, or a docking port, or some other wired port connection.

The memory interface 702 can be coupled to memory 708. The memory 708 can include high-speed random access memory and/or non-volatile memory, such as one or more magnetic disk storage devices, one or more optical storage devices, and/or flash memory (e.g., NAND, NOR). The memory 708 can store an operating system, such as Android, IOS from Apple, Darwin, RTXC, LINUX, UNIX, OS X, WINDOWS, or an embedded operating system such as VxWorks. The operating system may include instructions for handling basic system services and for performing hardware dependent tasks. In some implementations, the operating system can be a kernel (e.g., UNIX kernel).

The memory 708 may also store application programs 710-712 which act, in conjunction with the processors 704, to cause the mobile device to operate to perform certain functions, including the ATM transaction application related functions described herein.

The memory 708 can also store data, including but not limited to documents, images (including images containing advertisements and offers), video files, audio files, and other data. The mobile device 700 may be configured to operate using a number of different operating systems and to communicate using a number of different communications networks. Those skilled in the art will appreciate that the mobile device 700 may be sized as a handheld mobile phone, or other portable device such as a tablet computer or the like.

Transaction Process

Figure 8:
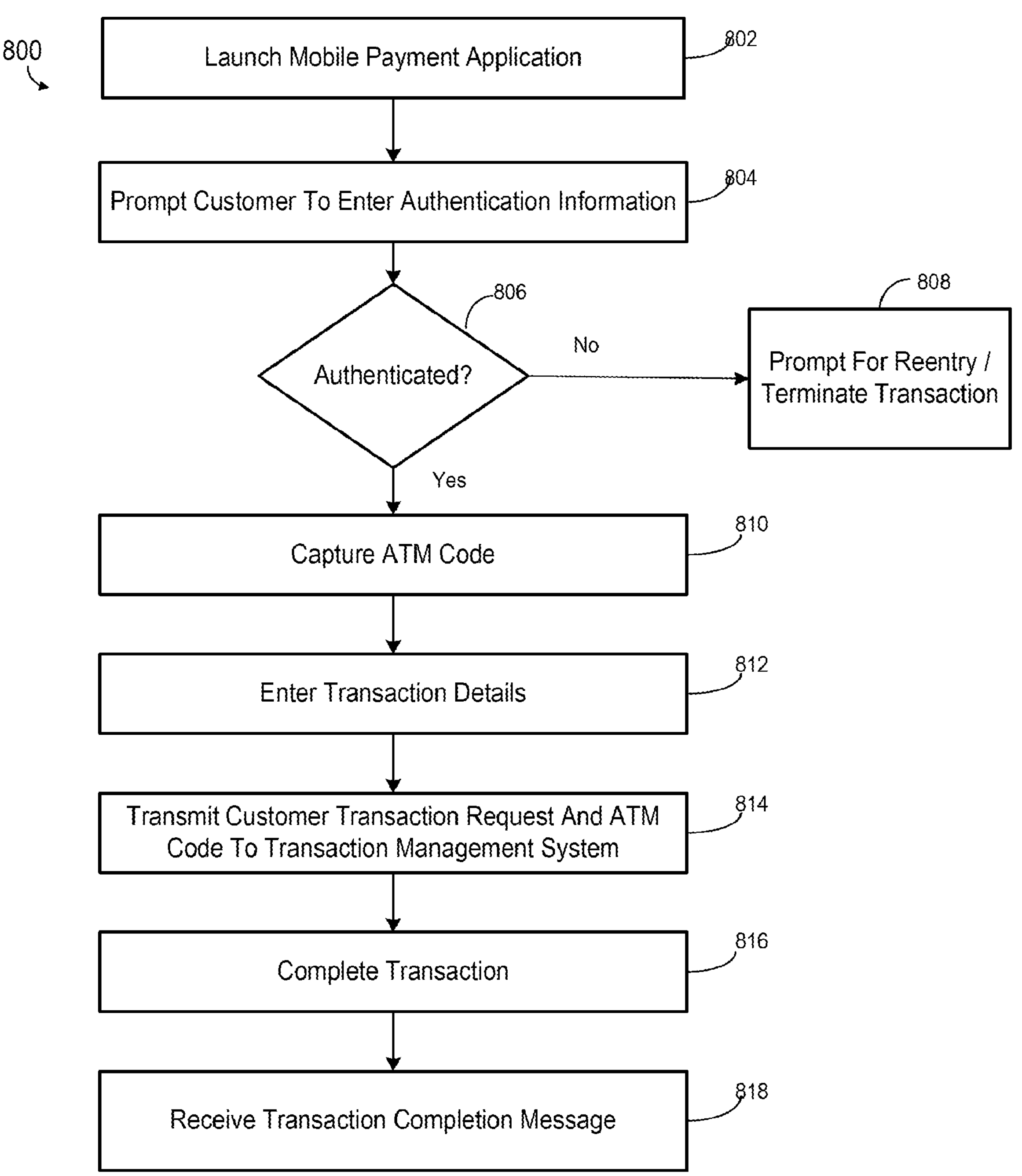
FIG. 8 is a flow chart depicting a process pursuant to some embodiments.

Reference is now made to FIG. 8, which is a flow diagram illustrating a transaction process 800 pursuant to some embodiments. The process 800 is shown from the perspective of an account holder (or "customer") operating a mobile device. For example, transaction process 800 includes a number of steps that may be performed by a customer operating a mobile device (such as the device 202 of FIG. 2) to complete transactions at ATMs pursuant to the present invention. Pursuant to some embodiments, the process 800 is executed under control of application software installed on the mobile device 202. In other embodiments, the process 800 is executed under control of software maintained and operated at a remote transaction system (or Web server in communication with the transaction system) and the mobile device 202 interacts with the software via a Web browser. The use of an application program will be described herein.

In some embodiments prior to executing an ATM transaction using the mobile device 202, a customer may first perform a registration process in which data associated with transaction accounts (such as one or more checking, savings, or other ATM-accessible accounts) are provided to the transaction management system and associated with the ATM application. Further, in some embodiments, authentication data for use in authenticating the customer and the mobile device 202 during a transaction may also be identified. Registration may include customer interaction with a registration server (which may be a component of, or related to, transaction management system 230 of FIG. 2) to initiate a registration process. For example, the customer may operate an Internet browser (either on a mobile device or another computing device) to access a registration Web page associated with the registration server. The registration Web page may request the customer provide some identifying information to begin the account creation process. For example, a customer may provide name, address and other contact information as well as contact preferences, including one or more email addresses and phone numbers. The customer may also establish an account during the registration process. The account may be associated with contact and identifying information associated with the customer, as well as information identifying one or more mobile device(s) from which the customer wishes to conduct ATM transactions. Each mobile device 202 may, for example, be identified by its phone number and/or other unique identifier(s) (such as a hardware serial number, an ASIN, a UUID in the case of an iPhone, a component serial number such as a CPU serial number or the like). In some embodiments, where the customer registers from a browser on their mobile device, or by first downloading an ATM application having a registration module onto their mobile device, the system may capture unique identifying information associated with the mobile device (e.g., such as a hardware serial number, an ASIN, a UUID or other device identifiers).

Pursuant to some embodiments, the ATM device 108 is not provided with any actual payment credentials of the customer during a transaction. Further, the mobile device 102 never stores, sends or receives actual payment credentials. Instead, the mobile device 102 stores or has access to a proxy associated with actual payment credentials, and the proxy is used to identify a desired payment account for use in a given transaction. The proxy is transmitted to the transaction management system 230 in a request message and the transaction management system 230 uses the proxy to lookup or identify the actual payment credentials associated with the selected account. The actual payment credentials are then transmitted from the transaction management system 230 to an account issuer or agent for authorization. By ensuring that actual payment credentials are not revealed to or stored at an ATM device 108 or mobile device 102, embodiments provide increased account security and reduced potential for fraud or abuse.

In some embodiments, the customer may optionally establish one or more preferences or rules associated with the use of one or more of the transaction accounts. For example, the customer may designate one of the accounts as the "primary" or default account. Other rules and preferences may also be set to enable accounts to be selected and used in an efficient and logical manner. For example, a customer may specify priorities or other account-based rules to indicate which transaction account is the default account for cash withdrawals, which one is the default for deposits, and which one should be used for overseas ATM transactions.

A customer may also specify transaction limitations or balance requirements that govern how and when a transaction account is to be presented as an option. For example, if a customer's Bank of America checking account allows 2 free ATM withdrawals each month, and the customer's JP Morgan Chase savings account also allows 2 free ATM withdrawals a month, the customer may wish to use the Bank of America account 2 times and the Chase account 2 times (subject to other balance rules and preferences set by the customer).

In some embodiments, a rule (such as a customer-specified rule), may cause a payment process to proceed more quickly, or with fewer customer steps. For example, a customer may specify that when conducting a transaction at an ATM, she typically wishes to withdraw a default amount of cash each time, and typically wishes to use her default checking account. In such situations, an ATM transaction using the present invention may proceed without need for the customer to select or confirm the selection of the transaction account and transaction details—it is done automatically by application of the customer-specified rule.

Those skilled in the art will appreciate, upon reading this disclosure, that a wide variety and type of account-level rules may be specified to allow a customer to manage how (and when) transaction accounts are presented as transaction options.

Referring again to the process 800 of FIG. 8, once a customer has registered and configured an account and a transaction application pursuant to the present invention, she may use the mobile device 202 to conduct an ATM transaction at participating ATM devices 208. Process 800 begins at 802 where the customer who is a participant in the ATM transaction program of the present invention launches an ATM application on their mobile device 202. The ATM transaction application may be an "app" or computer program code stored on the mobile device 202, or, in some embodiments, the ATM transaction application may be accessed by pointing a Web browser associated with the mobile device 202 to a Web page associated with an ATM application over the Internet. For the remainder of this discussion of process 802, it will be assumed that the ATM transaction application is an application stored on the mobile device 202 (but such discussion is not intended to limit the application of the present invention to such an embodiment). In some embodiments, the start of a transaction may also include the customer selecting an option to perform a mobile transaction at an ATM device 208 (which, as discussed above, may cause a message to be transmitted to a transaction management system which generates an ATM code for display on a display screen of the ATM device 208 for capture by the customer).

Processing continues at 804 where the customer is prompted to enter authentication information. For example, the customer may be prompted to enter information such as a user identifier, a password, or other credentials into a login screen displayed on the mobile device 202. Processing at 804 may also include collecting or generating device-related information for use in authenticating the customer. The customer authentication information, as well as any device-related information, are transmitted to the transaction management system 230 (e.g., over a network 201) for authentication by the transaction management system 230. In some embodiments, processing at 804 may be performed subsequent to the capture of an ATM code (described below at 810).

A determination is made at 806 whether the authentication passed or failed (e.g., based on a response received from the transaction management system 230). If the authentication failed, processing may continue at 808 where the customer is informed of the failure and is either prompted to reattempt the authentication process or that the transaction request has been terminated. The transaction management system 230 uses the received information to determine if the customer (and/or device) can be successfully authenticated based on information previously stored at or accessible to the transaction management system 230. For example, in the situation where a password authentication is required, processing at 806 may include a determination of whether the password received matches a stored password for the customer.

Processing continues at 810 if the authentication processing is successful (that is, if the customer and the device have successfully been identified by the transaction management system 230), where the mobile payment application enables the customer to take steps to capture an ATM code displayed on a display screen of (or otherwise associated with) the ATM device 208 the customer wishes to conduct a transaction with. Processing at 810 may also include presenting a list of ATM transaction options to the customer. For example, once the ATM code has been captured, the mobile device may display all of the customer's transaction accounts that have been registered with the system. This allows a customer to view their available accounts as well as available transaction prior to completing a transaction.

For example, in some embodiments, the customer may be prompted to point a camera of the mobile device 202 at a bar code image of an ATM code and to operate the mobile device 202 to capture the image. As another example, the customer may be prompted to key enter the ATM code or otherwise enter it into the mobile device 202. In some embodiments, the ATM code 210 is captured by a camera or other image capture device of the mobile device 202 (e.g., as shown in the user interface diagram 300 of FIG. 3). For example, in some embodiments, the ATM transaction application on the mobile device 202 is configured to automatically detect and capture the ATM code 210 using a camera associated with the mobile device 202, or a wireless receiver.

In some embodiments, the camera may be operated in a continuous scanning mode where (without input from the user except, for example, a single push of the “Pay” button) the camera will rapidly (multiple times each second) capture an image of the ATM code 210, each of which is processed by the mobile application until it successfully decodes the image of the ATM code 210. This continuous scanning mode is useful, since it frees the user from repeatedly having to push the camera button to capture images in the case where the first images captured cannot be decoded by the application, due to, for example, the image not being clear enough due to the camera’s viewfinder not completely capturing the image of the ATM code or for other reasons. To optimize and speed this process, the application may take into account specific attributes of the phone and its camera hardware, including the resolution of the image captured, the focal length of the camera, and other attributes. To further optimize the capture process, the size of the token, the angle of the surface on which the ATM code 210 is displayed, and other information may also be used to optimize the speed and accuracy of the ATM code capture process.

The ATM transaction application installed on the mobile device 202 may interact with one or more other sensors (such as those described above in conjunction with FIG. 7, including, for example, a magnetometer, a gyroscope, and/or an accelerometer) during a capture process. In some embodiments, the ATM transaction application may interact with such sensors to improve capture accuracy. For example, the ATM transaction application may adjust characteristics or control of the mobile device’s camera hardware (e.g., such as by adjusting or controlling the image resolution and/or focal length of the camera), or adjust the algorithms and processes used to search the image data for a ATM code 210, based on data received from sensors such as a magnetometer, gyroscope, accelerometer or the like. For example, data associated with a mobile device, it’s sensors, and hardware characteristics (such as the focal length of the device’s camera, the model of the phone, etc.) may be used as inputs for calculating a camera matrix or a projection matrix which is used to assist in compensating for image distortions including skew or the like. In this manner, data from mobile device 202 positioning or other characteristics may be taken into account when attempting to capture ATM codes, thereby ensuring accurate and consistent capture of data. Further, this data and these compensation techniques may be used to more quickly locate an ATM code during an imaging or capture process.

As an illustrative example, referring to an example camera on an iPhone device, the projection matrix may be dependent on a few physical characteristics, including the camera focal length (which is 3.85 mm for one version of the phone), the imaging plane (which is ¼" for the same version of the phone), the physical size of the position marks in a capture, and the physical distance between the position marks. Based on this information, embodiments are able to identify a spatial location for position marks relative to the camera, and from that data, a tilt of the checkout token relative to the camera sensor may be calculated. Pursuant to some embodiments, a projection matrix (or camera matrix) is used to describe the tilt with respect to the camera sensor and is used to adjust the capture process to ensure that ATM codes may be efficiently and accurately captured even in situations where the customer is not holding the mobile device 202 in a manner where the camera sensor is directly orthogonal to the ATM code. By improving the capture process using these techniques, the customer experience and speed and accuracy of capturing ATM codes is improved.

In embodiments where the ATM code 210 is displayed in the form of an encoded bar code image, the ATM transaction application installed on the mobile device 202 may automatically operate to decode the bar code image to obtain the ATM code 210. The encoded bar code image may be presented in a number of different formats, including as a one dimensional or two dimensional bar code image or the like. In some embodiments, the ATM code 210 may be displayed as an unencoded string of characters that may be key-entered into the payment application of the mobile device. In some embodiments, the ATM code 210 may be read or entered into the payment application of the mobile device using other means, such as, for example, by wireless communication (e.g., such as by Bluetooth communication, by RFID detection, by optical character recognition, or the like).

Processing continues at 812 where the customer specifies one or more transaction details, including, for example, a transaction type (e.g., withdrawal, deposit, balance inquiry, etc.) and a transaction amount. This information may be received from the customer via an input device of the mobile device 202 (such as illustrated in FIG. 4B) or it may be entered by the customer onto a display screen of the ATM device 208. The customer may also specify a desired account with which to conduct the transaction.

Processing may continue at 814 where the mobile device 202 transmits the ATM code and the transaction details in a customer transaction request message to the transaction management system 230. In some embodiments, the customer transaction request message includes information associated with the identity of the customer (determined during the authentication process). This information, coupled with information about the mobile device 202, allows the transaction management system 230 to determine that it is interacting with an authorized user operating an authorized device, allowing the system to locate the appropriate transaction account(s) for the user. The transaction management system 230 uses the ATM code and additional information received from the mobile device 202 (e.g., such as location data) to identify the specific transaction, the customer, and the specific ATM device 208 (or group of devices) with which the customer wishes to conduct a transaction. The ATM device(s) 208 may be identified by performing a database lookup of devices. The transaction management system 230 may also determine, based on the identified ATM device 208 or on other information contained within the transaction request message, a list of possible transaction options and other information for use in responding to the customer transaction request message.

In conjunction with processing the customer transaction request message, the transaction management system 230 may interact with the ATM device 208 identified by the ATM code 210 to activate it or configure it for use in completing or conducting the transaction with the customer. In some embodiments, this may include transmitting information associated with the customer and the customer's selected transaction account to the ATM device 208, effectively enabling or activating the ATM device 208 for use in completing the transaction (e.g., by transmitting data to the ATM device 208 through an ATM switch or network). In some embodiments (as shown in conjunction with FIG. 5B, above) some authentication information may also be transmitted to both the ATM device 208 as well as the mobile device 202 (such as a passcode to be entered by the customer to complete the transaction). In some embodiments, the transaction management system 230 may await further information from the customer before transmitting information to the ATM device 208 (e.g., such as awaiting a transaction amount and transaction type from the customer).

Processing continues at 816 where the customer completes the transaction. Completion of the transaction includes some customer interaction with the ATM device 208 (e.g., to withdraw cash, deposit funds, or the like). In some embodiments, processing at 816 may include presenting specific instructions to the customer (e.g., on a display screen of the mobile device 202), such as shown in FIG. 5A and 5B. For example, the transaction management system 230, in response to a customer transaction request, and after authenticating the customer, the mobile device, and the received ATM code 210, establishes communication with the specific ATM device 208 identified by the code 210 and allows the customer to conduct the transaction. In some embodiments, this involves transmitting instructions to the ATM device to activate a cash dispenser, a deposit mechanism, or the like. In other embodiments, this may include communicating a shared secret (such as a passcode or the like) to both the mobile device 202 and to the ATM device 208. The customer then causes the shared secret to be entered into the ATM device 208 to conduct the transaction.

Once the transaction is complete, processing continues at 818 where a transaction completion message is received. In some embodiments, the transaction completion message may be displayed on a display device of the mobile device 202, confirming to the customer that the transaction has concluded.

While a number of transaction flows have been described herein, those skilled in the art, upon reading this disclosure, will appreciate that a number of other flows may be achieved using features of the present invention. For example, in some embodiments, most of the transaction interaction and details may be specified by the account holder by interacting with the mobile device 202 prior to approaching an ATM device 208 (such as by completing an authentication process, selecting a transaction type, a transaction amount, and an account). Then, when the account holder is ready to conduct the transaction, she can approach the ATM device 208, select an ATM option for a "mobile transaction" and scan or capture the ATM code 210 that is presented by the ATM device 208. The transaction may then complete with little to no further action by the account holder. In this manner, ATM transactions may be completed quickly and efficiently, triggered and completed by the act of capturing the ATM code. Those skilled in the art will now appreciate that a number of other transaction processes may be realized using features of the present invention.

Further, although traditional ATM-type transactions have been described herein, embodiments may be used to conduct other types of transactions as well. For example, embodiments may be used to conduct funds transfers between the account holder and remote parties, such as other account holders or entities. As a specific example, embodiments may be used to conduct person to person fund transfers, including funds transfers where the account holder deposits funds into an ATM device, and authorizes those funds to be transferred to another person.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

The invention claimed is:

1. A system comprising:
- a non-transitory memory storing instructions; and
- one or more hardware processors coupled to the non-transitory memory and configured to execute the instructions from the non-transitory memory to cause the system to perform operations comprising:
  - in response to receiving a transaction request from a mobile device, generating a code that represents the transaction request, wherein the code is encoded with data provided by a user of the mobile device in association with the transaction request;
  - associating the code with a transaction record associated with the transaction request stored in a database;
  - subsequent to the generating the code, receiving code data from the mobile device based on a communication of the code data between a secured storage system and the mobile device in association with the transaction request;
  - determining information associated with the transaction request based on matching the code data with the transaction record;
  - identifying, from a plurality of secured storage devices associated with the secured storage system, a particular secured storage device for processing the transaction request based on the information; and
  - causing the particular secured storage device to process the transaction request.

2. The system of claim 1, wherein the operations further comprise:
- authenticating the user of the mobile device for the transaction request, wherein the causing the particular secured storage device to process the transaction request is in response to authenticating the user of the mobile device.

3. The system of claim 2, wherein the authenticating the user is based on credentials received from the mobile device.

4. The system of claim 1, wherein the causing the particular secured storage device to process the transaction request comprises providing the user of the mobile device access to one or more items stored within the particular secured storage device.

5. The system of claim 1, wherein the communication is a short-range wireless communication.

6. The system of claim 1, wherein the code uniquely identifies the particular secured storage device from the plurality of secured storage devices.

7. The system of claim 1, wherein the plurality of secured storage devices is located within a geographical boundary.

8. A method comprising:

receiving, by a computer system and from a mobile device, a transaction request for accessing one or more items;

generating, by the computer system, a code that uniquely identifies the transaction request, wherein the code comprises data provided by a user of the mobile device in association with the transaction request;

associating the code with a transaction record stored in a database;

subsequent to the generating the code, receiving code data representing the code from the mobile device based on a communication between the mobile device and a storage system;

identifying, by the computer system and from a plurality of storage devices associated with the storage system, a particular storage device based on matching the code data to the transaction record in the database; and causing the particular storage device to process the transaction request.

9. The method of claim 8, further comprising authenticating the user of the mobile device for processing the transaction based on credentials received via the mobile device.

10. The method of claim 9, wherein the causing the particular storage device to process the transaction request is in response to authenticating the user of the mobile device.

11. The method of claim 8, wherein the transaction record comprises information associated with the transaction request.

12. The method of claim 8, wherein the causing the particular storage device to process the transaction request comprises providing the user of the mobile device access to the one or more items stored within the particular storage device.

13. The method of claim 8, wherein the code uniquely identifies the particular storage device from the plurality of storage devices.

14. The method of claim 8, wherein the plurality of storage devices is located within a geographical boundary.

15. A non-transitory machine-readable medium having stored thereon machine-readable instructions executable to cause a machine to perform operations comprising:

in response to receiving a transaction request from a mobile device, generating a code that represents the transaction request, wherein the code is encoded with data provided by a user of the mobile device in association with the transaction request;

associating the code with a transaction record stored in a database;

subsequent to the generating the code, receiving code data from the mobile device based on a communication of the code data between a storage system and the mobile device;

determining information associated with the transaction request based on matching the code data with the transaction record in the database;

identifying, from a plurality of storage devices associated with the storage system, a particular storage device for processing the transaction request based on the information; and causing the particular storage device to process the transaction request.

16. The non-transitory machine-readable medium of claim 15, wherein the communication is a short-range wireless communication.

17. The non-transitory machine-readable medium of claim 15, wherein prior to the causing, the operations further comprise:

authenticating the user of the mobile device for the transaction request.

18. The non-transitory machine-readable medium of claim 17, wherein the authenticating the user is based on credentials received from the mobile device.

19. The non-transitory machine-readable medium of claim 15, wherein the causing the particular storage device to process the transaction request comprises providing the user of the mobile device access to one or more items from the particular storage device.

20. The non-transitory machine-readable medium of claim 15, wherein the plurality of storage devices is located within a geographical boundary associated with the storage system.

* * * * *